US 12,551,656 B2

(12) United States Patent
Oliverius et al.

(10) Patent No.: US 12,551,656 B2
(45) Date of Patent: *Feb. 17, 2026

(54) LAYERED HIGH DENSITY ELECTRODE MAPPING CATHETER

(71) Applicant: St. Jude Medical, Cardiology Division, Inc., St. Paul, MN (US)

(72) Inventors: Andrew Oliverius, Eagan, MN (US); Neil Hawkinson, Ramsey, MN (US); Timothy S. Marass, Minneapolis, MN (US); Wade Welter, Brooklyn Park, MN (US); Nicholas Strom, Minneapolis, MN (US); Quinn Butler, Coon Rapids, MN (US); James Marrs, Arden Hills, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 701 days.

This patent is subject to a terminal disclaimer.

(21) Appl. No.: 17/864,161

(22) Filed: Jul. 13, 2022

(65) Prior Publication Data

US 2022/0401693 A1  Dec. 22, 2022

Related U.S. Application Data

(63) Continuation of application No. 16/029,038, filed on Jul. 6, 2018, now Pat. No. 11,433,220.
(Continued)

(51) Int. Cl.
*A61B 5/287* (2021.01)
*A61B 5/00* (2006.01)
(Continued)

(52) U.S. Cl.
CPC ........... *A61M 25/008* (2013.01); *A61B 5/287* (2021.01); *A61B 5/6858* (2013.01);
(Continued)

(58) Field of Classification Search
CPC ........... A61M 25/008; A61M 25/0043; A61M 25/0074; A61M 2025/0081; A61B 5/287;
(Continued)

(56) References Cited

U.S. PATENT DOCUMENTS 4,522,212 A  6/1985  Gelinas et al.
5,044,368 A  9/1991  Putz
(Continued)

FOREIGN PATENT DOCUMENTS

AU   2015202258 A1   5/2015
AU   2016204351 A1   1/2017
(Continued)

OTHER PUBLICATIONS

"Electroplating the Platinum Metals—A Recent Survey of Processes and Applications", Platinum Metals Review, vol. 14, No. 3, 1970, pp. 93-94.
(Continued)

*Primary Examiner* — Adam Z Minchella
(74) *Attorney, Agent, or Firm* — Kilpatrick Townsend & Stockton LLP

(57) ABSTRACT

Various embodiments of the present disclosure can include flexible catheter tip. The flexible catheter tip can include an inboard understructure that defines a tip longitudinal axis, wherein the inboard understructure can be formed from a first continuous element that includes a first rectangular cross-section. An intermediate inboard covering can be disposed about the first continuous element that forms a distal portion of the inboard understructure. An outboard understructure can extend along the tip longitudinal axis, wherein the outboard understructure can be formed from a second continuous element that includes a second rectangular cross-section. An intermediate outboard covering can
(Continued)

be disposed about the second continuous element that forms a distal portion of the outboard understructure.

17 Claims, 9 Drawing Sheets

Related U.S. Application Data

(60) Provisional application No. 62/529,586, filed on Jul. 7, 2017.

(51) Int. Cl.
    *A61B 18/00*         (2006.01)
    *A61B 18/14*         (2006.01)
    *A61M 25/00*        (2006.01)
    *A61B 18/12*         (2006.01)

(52) U.S. Cl.
    CPC ..... *A61B 18/1492* (2013.01); *A61M 25/0043* (2013.01); *A61M 25/0074* (2013.01); *A61B 2018/0016* (2013.01); *A61B 2018/00267* (2013.01); *A61B 2018/00357* (2013.01); *A61B 2018/00577* (2013.01); *A61B 2018/00839* (2013.01); *A61B 2018/1253* (2013.01); *A61B 2018/126* (2013.01); *A61B 2562/0209* (2013.01); *A61B 2562/028* (2013.01); *A61B 2562/164* (2013.01); *A61M 2025/0081* (2013.01)

(58) Field of Classification Search
    CPC .............. A61B 5/6858; A61B 18/1492; A61B 2018/0016; A61B 2018/00267; A61B 2018/00357; A61B 2018/00577; A61B 2018/00839; A61B 2018/1253; A61B 2018/126; A61B 2562/0209; A61B 2562/028; A61B 2562/164
    See application file for complete search history.

(56) References Cited

U.S. PATENT DOCUMENTS

| | | |
|---|---|---|
| 5,156,151 A | 10/1992 | Imran |
| 5,224,939 A | 7/1993 | Holman et al. |
| 5,380,301 A | 1/1995 | Prichard et al. |
| 5,400,783 A | 3/1995 | Pomeranz et al. |
| 5,450,846 A | 9/1995 | Goldreyer |
| 5,456,254 A | 10/1995 | Pietroski et al. |
| 5,465,717 A | 11/1995 | Imran et al. |
| 5,626,136 A | 5/1997 | Webster, Jr. |
| 5,647,870 A | 7/1997 | Kordis et al. |
| 5,702,438 A | 12/1997 | Avitall |
| 5,715,817 A | 2/1998 | Stevens-Wright et al. |
| 5,715,832 A | 2/1998 | Koblish et al. |
| 5,827,278 A | 10/1998 | Webster, Jr. |
| 5,836,947 A | 11/1998 | Fleischman et al. |
| 5,846,196 A | 12/1998 | Siekmeyer et al. |
| 5,876,373 A | 3/1999 | Giba et al. |
| 5,879,295 A | 3/1999 | Li et al. |
| 5,893,847 A | 4/1999 | Kordis |
| 5,904,680 A | 5/1999 | Kordis et al. |
| 5,964,757 A | 10/1999 | Ponzi |
| 6,029,091 A | 2/2000 | de la Rama et al. |
| 6,071,282 A | 6/2000 | Fleischman |
| 6,074,379 A | 6/2000 | Prichard |
| 6,120,476 A | 9/2000 | Fung et al. |
| 6,123,699 A | 9/2000 | Webster, Jr. |
| 6,171,277 B1 | 1/2001 | Ponzi |
| 6,183,463 B1 | 2/2001 | Webster, Jr. |
| 6,198,974 B1 | 3/2001 | Webster, Jr. |
| 6,210,407 B1 | 4/2001 | Webster |
| 6,216,043 B1 | 4/2001 | Swanson et al. |
| 6,267,746 B1 | 7/2001 | Bumbalough |
| 6,273,404 B1 | 8/2001 | Holman et al. |
| 6,415,187 B1 | 7/2002 | Kuzma et al. |
| 6,430,426 B2 | 8/2002 | Avitall |
| 6,454,766 B1 | 9/2002 | Swanson et al. |
| 6,477,423 B1 | 11/2002 | Jenkins |
| 6,491,681 B1 | 12/2002 | Kunis et al. |
| 6,522,932 B1 | 2/2003 | Kuzma et al. |
| 6,554,794 B1 | 4/2003 | Mueller et al. |
| 6,652,515 B1 | 11/2003 | Maguire et al. |
| 6,658,302 B1 | 12/2003 | Kuzma et al. |
| 6,961,602 B2 | 11/2005 | Fuimaono et al. |
| 7,004,937 B2 | 2/2006 | Lentz et al. |
| 7,027,851 B2 | 4/2006 | Mejia |
| 7,089,045 B2 | 8/2006 | Fuimaono et al. |
| 7,099,712 B2 | 8/2006 | Fuimaono et al. |
| 7,214,220 B2 | 5/2007 | McGlinch et al. |
| 7,217,256 B2 | 5/2007 | Di Palma |
| 7,228,164 B2 | 6/2007 | Fuimaono et al. |
| 7,257,435 B2 | 8/2007 | Plaza |
| 7,412,274 B2 | 8/2008 | Mejia |
| 7,429,261 B2 | 9/2008 | Kunis et al. |
| 7,561,907 B2 | 7/2009 | Fuimaono et al. |
| 7,608,063 B2 | 10/2009 | Le et al. |
| 7,625,365 B2 | 12/2009 | McGlinch et al. |
| 7,666,204 B2 | 2/2010 | Thornton et al. |
| 7,959,601 B2 | 6/2011 | McDaniel et al. |
| 7,985,215 B2 | 7/2011 | Guo et al. |
| 8,103,327 B2 | 1/2012 | Harlev et al. |
| 8,137,321 B2 | 3/2012 | Argentine |
| 8,157,848 B2 | 4/2012 | Zhang et al. |
| 8,221,390 B2 | 7/2012 | Pal et al. |
| 8,271,099 B1 | 9/2012 | Swanson |
| 8,273,016 B2 | 9/2012 | O'Sullivan |
| 8,364,234 B2 | 1/2013 | Kordis et al. |
| 8,364,236 B2 | 1/2013 | Burke et al. |
| 8,376,990 B2 | 2/2013 | Ponzi et al. |
| 8,391,947 B2 | 3/2013 | Urman et al. |
| 8,447,377 B2 | 5/2013 | Harlev et al. |
| 8,486,063 B2 | 7/2013 | Werneth et al. |
| 8,560,086 B2 | 10/2013 | Just et al. |
| 8,565,894 B2 | 10/2013 | Vetter et al. |
| 8,603,069 B2 | 12/2013 | Selkee |
| 8,608,703 B2 | 12/2013 | Riles et al. |
| 8,649,880 B1 | 2/2014 | Parker, Jr. |
| 8,700,120 B2 | 4/2014 | Koblish |
| 8,706,193 B2 | 4/2014 | Govari et al. |
| 8,744,599 B2 | 6/2014 | Tegg |
| 8,755,861 B2 | 6/2014 | Harlev et al. |
| 8,771,267 B2 | 7/2014 | Kunis et al. |
| 8,777,929 B2 | 7/2014 | Schneider et al. |
| 8,792,962 B2 | 7/2014 | Esguerra et al. |
| 8,795,504 B2 | 8/2014 | Petrossians et al. |
| 8,814,824 B2 | 8/2014 | Kauphusman et al. |
| 8,814,825 B2 | 8/2014 | Tegg et al. |
| 8,882,705 B2 | 11/2014 | McDaniel et al. |
| 8,894,610 B2 | 11/2014 | Macnamara et al. |
| 8,903,508 B2 | 12/2014 | Feler |
| 8,979,841 B2 | 3/2015 | Kunis et al. |
| 8,996,091 B2 | 3/2015 | de la Rama et al. |
| 9,017,308 B2 | 4/2015 | Klisch et al. |
| 9,033,917 B2 | 5/2015 | Magana et al. |
| 9,044,245 B2 | 6/2015 | Condie et al. |
| 9,050,010 B2 | 6/2015 | Bui et al. |
| 9,101,733 B2 | 8/2015 | McDaniel |
| 9,204,929 B2 | 12/2015 | Solis |
| 9,216,056 B2 | 12/2015 | Datta et al. |
| 9,247,990 B2 | 2/2016 | Kauphusman et al. |
| 9,326,815 B2 | 5/2016 | Watson |
| 9,339,631 B2 | 5/2016 | Graham et al. |
| 9,433,751 B2 | 9/2016 | Ponzi et al. |
| 9,433,752 B2 | 9/2016 | Jimenez et al. |
| 9,468,495 B2 | 10/2016 | Kunis et al. |
| 9,474,486 B2 | 10/2016 | Eliason et al. |
| 9,474,894 B2 | 10/2016 | Mercanzini et al. |
| 9,486,280 B2 | 11/2016 | Koblish et al. |
| 9,486,282 B2 | 11/2016 | Solis |
| 9,522,035 B2 | 12/2016 | Highsmith |
| 9,532,703 B2 | 1/2017 | Huszar et al. |
| 9,539,413 B2 | 1/2017 | Ogle |

(56) References Cited

U.S. PATENT DOCUMENTS

| | | |
|---|---|---|
| 9,629,675 B2 | 4/2017 | Kleshinski et al. |
| 9,649,158 B2 | 5/2017 | Datta et al. |
| 9,687,166 B2 | 6/2017 | Subramaniam et al. |
| 9,693,733 B2 | 7/2017 | Altmann et al. |
| 9,694,159 B2 | 7/2017 | Schneider et al. |
| 9,694,161 B2 | 7/2017 | Selkee |
| 9,713,418 B2 | 7/2017 | Huszar et al. |
| 9,788,895 B2 | 10/2017 | Solis |
| 9,820,664 B2 | 11/2017 | Hoitink et al. |
| 9,833,608 B2 | 12/2017 | Masson |
| 9,844,645 B2 | 12/2017 | Pai et al. |
| 9,848,795 B2 | 12/2017 | Marecki et al. |
| 9,907,480 B2 | 3/2018 | Basu et al. |
| 9,919,132 B2 | 3/2018 | Tegg et al. |
| 9,949,656 B2 | 4/2018 | Wu et al. |
| 9,986,949 B2 | 6/2018 | Govari et al. |
| 10,004,877 B2 | 6/2018 | Tegg |
| 10,034,637 B2 | 7/2018 | Harlev et al. |
| 10,052,457 B2 | 8/2018 | Nguyen et al. |
| 10,065,019 B2 | 9/2018 | Hamuro et al. |
| 10,099,036 B2 | 10/2018 | Heideman et al. |
| 10,118,022 B2 | 11/2018 | Helgeson et al. |
| 10,130,423 B1 | 11/2018 | Viswanathan et al. |
| 10,136,829 B2 | 11/2018 | Deno et al. |
| 10,143,394 B2 | 12/2018 | Solis |
| 10,172,673 B2 | 1/2019 | Viswanathan et al. |
| 10,285,610 B2 | 5/2019 | Wu |
| 10,322,261 B2 | 6/2019 | Pai et al. |
| 10,362,952 B2 | 7/2019 | Basu et al. |
| 10,362,954 B2 | 7/2019 | de la Rama et al. |
| 10,376,170 B2 | 8/2019 | Quinn et al. |
| 10,384,036 B2 | 8/2019 | Romoscanu |
| 10,398,500 B2 | 9/2019 | Huszar et al. |
| 10,470,682 B2 | 11/2019 | Deno et al. |
| 10,478,247 B2 | 11/2019 | Litscher et al. |
| 10,478,325 B2 | 11/2019 | Syed |
| 10,492,729 B2 | 12/2019 | de la Rama et al. |
| 10,506,938 B2 | 12/2019 | Wu et al. |
| 10,537,259 B2 | 1/2020 | Wu et al. |
| 10,542,899 B2 | 1/2020 | Wu et al. |
| 10,556,091 B2 | 2/2020 | Truhler et al. |
| 10,575,742 B2 | 3/2020 | Wu et al. |
| 10,575,745 B2 | 3/2020 | Solis |
| 10,578,737 B2 | 3/2020 | Gliner et al. |
| 10,595,738 B2 | 3/2020 | Sterrett et al. |
| 10,595,740 B2 | 3/2020 | Hoitink et al. |
| 10,602,948 B2 | 3/2020 | Wu et al. |
| 10,646,692 B2 | 5/2020 | Tegg et al. |
| 10,653,423 B2 | 5/2020 | Starnes |
| 10,702,177 B2 | 7/2020 | Aujla |
| 10,702,677 B2 | 7/2020 | Okamura et al. |
| 10,737,060 B2 | 8/2020 | Gupta et al. |
| 10,813,590 B2 | 10/2020 | Ruppersberg |
| 10,835,712 B2 | 11/2020 | Wada |
| 10,842,990 B2 | 11/2020 | de la Rama et al. |
| 10,857,349 B2 | 12/2020 | de la Rama et al. |
| 10,869,992 B2 | 12/2020 | Pai et al. |
| 10,898,685 B2 | 1/2021 | Tegg |
| 10,912,925 B2 | 2/2021 | Houck |
| 10,932,685 B2 | 3/2021 | Wu |
| 10,953,196 B2 | 3/2021 | Raab et al. |
| 10,966,623 B2 | 4/2021 | Wu et al. |
| 10,966,753 B2 | 4/2021 | Coyle et al. |
| 10,967,150 B2 | 4/2021 | Helgeson et al. |
| 10,973,427 B2 | 4/2021 | Aujla |
| 10,987,045 B2 | 4/2021 | Basu et al. |
| 11,033,715 B2 | 6/2021 | Beeckler et al. |
| 11,039,772 B2 | 6/2021 | Wu et al. |
| 11,039,773 B2 | 6/2021 | Sterrett et al. |
| 11,083,400 B2 | 8/2021 | Hoitink et al. |
| 11,116,436 B2 | 9/2021 | Wu et al. |
| 11,116,476 B2 | 9/2021 | Buesseler et al. |
| 11,141,568 B2 | 10/2021 | Hsueh et al. |
| 11,160,482 B2 | 11/2021 | Solis |
| 11,172,858 B2 | 11/2021 | Olson et al. |
| D940,310 S | 1/2022 | de la Rama et al. |
| 11,272,886 B2 | 3/2022 | Harlev et al. |
| D951,438 S | 5/2022 | de la Rama et al. |
| D952,140 S | 5/2022 | de la Rama et al. |
| D952,843 S | 5/2022 | de la Rama et al. |
| 11,382,690 B2 | 7/2022 | Smith et al. |
| 11,382,743 B2 | 7/2022 | Marchand et al. |
| 11,383,078 B2 | 7/2022 | de la Rama et al. |
| 11,419,673 B2 | 8/2022 | Kauphusman et al. |
| 11,439,460 B2 | 9/2022 | Sliwa et al. |
| 11,446,471 B2 | 9/2022 | Grunewald |
| D966,506 S | 10/2022 | de la Rama et al. |
| D966,507 S | 10/2022 | de la Rama et al. |
| 11,478,299 B2 | 10/2022 | Webster et al. |
| 11,484,690 B2 | 11/2022 | Tegg et al. |
| 11,491,311 B2 | 11/2022 | Selkee |
| 11,504,205 B2 | 11/2022 | Brucker et al. |
| 11,511,078 B2 | 11/2022 | Gonzalez |
| 11,523,748 B2 | 12/2022 | Esguerra Wilczynski et al. |
| 11,540,876 B2 | 1/2023 | Oliverius et al. |
| 11,547,437 B2 | 1/2023 | Zarembinski |
| 11,583,334 B2 | 2/2023 | Caples et al. |
| 11,602,630 B2 | 3/2023 | Vetter et al. |
| 11,617,616 B2 | 4/2023 | Clark et al. |
| 11,617,859 B2 | 4/2023 | Hsueh et al. |
| 11,617,861 B2 | 4/2023 | Pai et al. |
| 11,622,806 B2 | 4/2023 | Romoscanu |
| 11,628,009 B2 | 4/2023 | Aujla |
| 11,660,119 B2 | 5/2023 | Hassett |
| 11,690,552 B2 | 7/2023 | Wu et al. |
| 11,723,574 B2 | 8/2023 | Wu et al. |
| 11,786,301 B2 | 10/2023 | Olson |
| 11,806,152 B2 | 11/2023 | Zeidan et al. |
| 11,857,250 B2 | 1/2024 | Corvi et al. |
| 11,938,316 B2 | 3/2024 | Feler et al. |
| 11,950,897 B2 | 4/2024 | Esguerra Wilczynski et al. |
| 11,957,847 B2 | 4/2024 | Houck |
| 11,992,321 B2 | 5/2024 | Solis |
| 12,004,805 B2 | 6/2024 | Schuler et al. |
| 12,011,216 B2 | 6/2024 | Zirkle et al. |
| 12,036,027 B2 | 7/2024 | Olson et al. |
| 12,036,371 B2 | 7/2024 | Hsueh et al. |
| 12,064,168 B2 | 8/2024 | Harlev et al. |
| 12,076,079 B2 | 9/2024 | Oliverius et al. |
| 12,089,940 B2 | 9/2024 | Hoitink et al. |
| 12,097,034 B2 | 9/2024 | Wu et al. |
| 12,109,031 B2 | 10/2024 | Deno et al. |
| 12,114,922 B2 | 10/2024 | Harlev et al. |
| 12,121,357 B2 | 10/2024 | de la Rama et al. |
| 12,121,438 B2 | 10/2024 | Dehdashtian et al. |
| 12,144,629 B2 | 11/2024 | Wu et al. |
| 12,193,823 B2 | 1/2025 | Wu et al. |
| 12,214,206 B2 | 2/2025 | Ward et al. |
| 12,232,908 B2 | 2/2025 | Stigall et al. |
| 12,246,143 B2 | 3/2025 | Leeflang et al. |
| 12,256,913 B2 | 3/2025 | Nunan |
| 12,256,984 B2 | 3/2025 | Ku et al. |
| 12,263,338 B2 | 4/2025 | de la Rama et al. |
| 12,324,620 B2 | 6/2025 | de la Rama et al. |
| 12,337,124 B2 | 6/2025 | Campbell et al. |
| 2001/0047129 A1 | 11/2001 | Hall et al. |
| 2002/0068897 A1* | 6/2002 | Jenkins .............. A61B 18/1492 604/96.01 |
| 2002/0087208 A1 | 7/2002 | Koblish et al. |
| 2002/0165484 A1 | 11/2002 | Bowe et al. |
| 2003/0050636 A1 | 3/2003 | Swanson et al. |
| 2003/0120328 A1 | 6/2003 | Jenkins et al. |
| 2004/0186546 A1 | 9/2004 | Mandrusov et al. |
| 2005/0004440 A1 | 1/2005 | Vanney |
| 2005/0159741 A1 | 7/2005 | Paul et al. |
| 2007/0066878 A1 | 3/2007 | Worley et al. |
| 2007/0123852 A1 | 5/2007 | Deem et al. |
| 2007/0219546 A1 | 9/2007 | Mody et al. |
| 2008/0140152 A1 | 6/2008 | Imran et al. |
| 2008/0243214 A1 | 10/2008 | Koblish |
| 2008/0312521 A1 | 12/2008 | Solomon |
| 2008/0319418 A1 | 12/2008 | Chong |
| 2009/0149848 A1 | 6/2009 | Werneth et al. |
| 2009/0198300 A1 | 8/2009 | Zhang et al. |

(56) References Cited

U.S. PATENT DOCUMENTS

| | | |
|---|---|---|
| 2009/0240248 A1 | 9/2009 | Deford et al. |
| 2009/0287166 A1 | 11/2009 | Dang |
| 2009/0299355 A1 | 12/2009 | Bencini et al. |
| 2010/0016848 A1 | 1/2010 | Desai |
| 2010/0076426 A1 | 3/2010 | de la Rama et al. |
| 2010/0286684 A1 | 11/2010 | Hata et al. |
| 2011/0106074 A1 | 5/2011 | Kunis et al. |
| 2011/0118726 A1 | 5/2011 | de la Rama et al. |
| 2011/0160720 A1 | 6/2011 | Johnson |
| 2011/0160721 A1 | 6/2011 | Wang et al. |
| 2011/0190732 A1 | 8/2011 | Majercak et al. |
| 2011/0213231 A1* | 9/2011 | Hall ............. A61B 5/287 600/373 |
| 2011/0238054 A1 | 9/2011 | Kim et al. |
| 2011/0313417 A1 | 12/2011 | De La Rama et al. |
| 2012/0172697 A1 | 7/2012 | Urman et al. |
| 2012/0271302 A1 | 10/2012 | Behl et al. |
| 2012/0296232 A1 | 11/2012 | Ng |
| 2013/0012938 A1 | 1/2013 | Asirvatham et al. |
| 2013/0231659 A1 | 9/2013 | Hill et al. |
| 2013/0253504 A1 | 9/2013 | Fang |
| 2013/0274582 A1 | 10/2013 | Afonso et al. |
| 2014/0100639 A1 | 4/2014 | Lee et al. |
| 2014/0142408 A1 | 5/2014 | de la Rama et al. |
| 2014/0200639 A1* | 7/2014 | De La Rama ....... A61N 1/0476 607/116 |
| 2014/0269602 A1 | 9/2014 | Kawagishi |
| 2014/0288552 A1 | 9/2014 | Kunis et al. |
| 2014/0296846 A1 | 10/2014 | Huszar et al. |
| 2014/0296849 A1 | 10/2014 | Coe et al. |
| 2014/0296902 A1 | 10/2014 | Huszar et al. |
| 2014/0316496 A1 | 10/2014 | Masson et al. |
| 2014/0336636 A1 | 11/2014 | Huszar et al. |
| 2014/0350564 A1 | 11/2014 | Huszar et al. |
| 2015/0001191 A1 | 1/2015 | Lee et al. |
| 2015/0105645 A1 | 4/2015 | Subramaniam et al. |
| 2015/0119911 A1 | 4/2015 | Mckenzie |
| 2015/0133760 A1 | 5/2015 | Kordis et al. |
| 2015/0141785 A1 | 5/2015 | Hayam et al. |
| 2015/0159741 A1 | 6/2015 | Versteyhe et al. |
| 2015/0351652 A1 | 12/2015 | Marecki et al. |
| 2016/0143588 A1 | 5/2016 | Hoitink et al. |
| 2016/0151113 A1 | 6/2016 | Kim et al. |
| 2016/0213423 A1 | 7/2016 | Kauphusman et al. |
| 2016/0213916 A1 | 7/2016 | de la Rama |
| 2016/0278851 A1 | 9/2016 | Mannion et al. |
| 2016/0317094 A1 | 11/2016 | Byrd et al. |
| 2016/0331471 A1 | 11/2016 | Deno et al. |
| 2016/0331933 A1 | 11/2016 | Knutsen |
| 2016/0374582 A1* | 12/2016 | Wu ............. A61B 5/287 606/41 |
| 2016/0374753 A1 | 12/2016 | Wu et al. |
| 2017/0000365 A1 | 1/2017 | Wu et al. |
| 2017/0042449 A1 | 2/2017 | Deno et al. |
| 2017/0049348 A1 | 2/2017 | Deno et al. |
| 2017/0112405 A1 | 4/2017 | Sterrett et al. |
| 2017/0273738 A1 | 9/2017 | Wu |
| 2017/0319269 A1 | 11/2017 | Oliverius et al. |
| 2017/0367756 A1 | 12/2017 | Sliwa et al. |
| 2018/0042667 A1 | 2/2018 | Pappone et al. |
| 2018/0050190 A1 | 2/2018 | Masson |
| 2018/0056038 A1 | 3/2018 | Aujla |
| 2018/0070845 A1 | 3/2018 | Hoitink et al. |
| 2018/0085064 A1 | 3/2018 | Auerbach et al. |
| 2018/0116539 A1 | 5/2018 | Olson et al. |
| 2018/0161093 A1 | 6/2018 | Basu et al. |
| 2018/0193089 A1 | 7/2018 | Wu |
| 2018/0229030 A1 | 8/2018 | Dubuclet et al. |
| 2018/0235496 A1 | 8/2018 | Wu et al. |
| 2018/0303361 A1 | 10/2018 | Wu et al. |
| 2018/0335519 A1 | 11/2018 | Gliner et al. |
| 2018/0369574 A1 | 12/2018 | Dubuclet et al. |
| 2018/0374582 A1 | 12/2018 | Holmes et al. |
| 2019/0175043 A1 | 6/2019 | Wu et al. |
| 2019/0192826 A1 | 6/2019 | Wada |
| 2020/0000359 A1 | 1/2020 | de la Rama et al. |
| 2020/0054391 A1 | 2/2020 | Litscher et al. |
| 2020/0069365 A1 | 3/2020 | Harlev et al. |
| 2020/0077912 A1 | 3/2020 | Wu et al. |
| 2020/0138378 A1 | 5/2020 | de la Rama et al. |
| 2020/0155021 A1 | 5/2020 | Wu et al. |
| 2020/0221966 A1 | 7/2020 | Wu et al. |
| 2020/0229727 A1 | 7/2020 | Hoitink et al. |
| 2020/0253496 A1 | 8/2020 | Deno et al. |
| 2020/0329989 A1 | 10/2020 | Aujla |
| 2020/0405166 A1 | 12/2020 | Wu et al. |
| 2021/0145342 A1 | 5/2021 | Wang |
| 2021/0187246 A1 | 6/2021 | Houck |
| 2021/0204871 A1 | 7/2021 | Goedeke et al. |
| 2021/0228137 A1 | 7/2021 | Aujla |
| 2021/0267693 A1 | 9/2021 | Deno et al. |
| 2021/0268234 A1 | 9/2021 | Helgeson et al. |
| 2021/0298656 A1 | 9/2021 | Wu et al. |
| 2021/0361216 A1 | 11/2021 | Hoitink et al. |
| 2021/0401345 A1 | 12/2021 | Wu et al. |
| 2022/0023594 A1 | 1/2022 | Pai |
| 2022/0054066 A1 | 2/2022 | Solis |
| 2022/0061727 A1 | 3/2022 | Olson et al. |
| 2022/0273913 A1 | 9/2022 | Worley et al. |
| 2022/0354568 A1 | 11/2022 | Pappone et al. |
| 2022/0370792 A1 | 11/2022 | de la Rama et al. |
| 2022/0387012 A1 | 12/2022 | Nunan |
| 2023/0011509 A1 | 1/2023 | Sterrett et al. |
| 2023/0084626 A1 | 3/2023 | Grunewald |
| 2023/0114222 A1 | 4/2023 | Esguerra Wilczynski et al. |
| 2023/0121397 A1 | 4/2023 | Oliverius et al. |
| 2023/0172661 A1 | 6/2023 | Harlev et al. |
| 2023/0190369 A1 | 6/2023 | Caples et al. |
| 2023/0284956 A1 | 9/2023 | Wu et al. |
| 2023/0329618 A1 | 10/2023 | Wu et al. |
| 2023/0329784 A1 | 10/2023 | Stewart et al. |
| 2023/0404657 A1 | 12/2023 | Olson |
| 2024/0081905 A1 | 3/2024 | Corvi et al. |
| 2024/0173070 A1 | 5/2024 | Selkee et al. |
| 2024/0198054 A1 | 6/2024 | Schultz |
| 2024/0252815 A1 | 8/2024 | de la Rama et al. |
| 2024/0277277 A1 | 8/2024 | Hoitink et al. |
| 2024/0325691 A1 | 10/2024 | Bogusky |
| 2024/0350063 A1 | 10/2024 | Olson et al. |
| 2024/0415438 A1 | 12/2024 | Wu et al. |
| 2025/0009272 A1 | 1/2025 | de la Rama et al. |
| 2025/0025231 A1 | 1/2025 | Oliverius et al. |
| 2025/0032028 A1 | 1/2025 | Deno et al. |
| 2025/0032181 A1 | 1/2025 | Harlev et al. |
| 2025/0040853 A1 | 2/2025 | Wu et al. |
| 2025/0049460 A1 | 2/2025 | Worrell et al. |
| 2025/0072897 A1 | 3/2025 | Reu et al. |
| 2025/0082903 A1 | 3/2025 | Hsueh et al. |
| 2025/0090070 A1 | 3/2025 | Wu et al. |
| 2025/0090807 A1 | 3/2025 | Padilla et al. |
| 2025/0152932 A1 | 5/2025 | de la Rama et al. |
| 2025/0160942 A1 | 5/2025 | Ku et al. |

FOREIGN PATENT DOCUMENTS

| | | |
|---|---|---|
| AU | 2016204353 A1 | 1/2017 |
| AU | 2016204355 A1 | 1/2017 |
| CA | 2934209 A1 | 12/2016 |
| CA | 2934211 A1 | 12/2016 |
| CA | 2934214 A1 | 12/2016 |
| CN | 101797181 A | 8/2010 |
| CN | 103908342 A | 7/2014 |
| CN | 104159536 A | 11/2014 |
| CN | 101927053 B | 1/2015 |
| CN | 103157168 B | 4/2015 |
| CN | 104968261 A | 10/2015 |
| CN | 105615994 A | 6/2016 |
| CN | 105960201 A | 9/2016 |
| CN | 106264715 A | 1/2017 |
| CN | 106264716 A | 1/2017 |
| CN | 106308790 A | 1/2017 |
| CN | 106859765 A | 6/2017 |
| CN | 106901831 A | 6/2017 |
| CN | 206880930 U | 1/2018 |

(56) References Cited

FOREIGN PATENT DOCUMENTS

| | | |
|---|---|---|
| CN | 104958824 B | 12/2018 |
| CN | 104434083 B | 4/2019 |
| CN | 104968261 B | 5/2019 |
| CN | 105592778 B | 7/2019 |
| CN | 105960200 B | 8/2019 |
| CN | 105451680 B | 10/2019 |
| CN | 110536646 A | 12/2019 |
| CN | 105960201 B | 3/2020 |
| CN | 111657866 A | 9/2020 |
| CN | 106264715 B | 11/2020 |
| CN | 106264716 B | 11/2020 |
| CN | 106308790 B | 6/2021 |
| CN | 107529958 B | 7/2021 |
| CN | 109310469 B | 7/2021 |
| CN | 109641121 B | 9/2021 |
| CN | 109952123 B | 9/2021 |
| CN | 110545874 B | 9/2021 |
| CN | 110559544 B | 9/2021 |
| CN | 113425304 A | 9/2021 |
| CN | 105615994 B | 10/2021 |
| CN | 109963610 B | 11/2021 |
| CN | 108289709 B | 3/2022 |
| CN | 107773300 B | 8/2022 |
| CN | 108567424 B | 8/2022 |
| CN | 106859638 B | 10/2022 |
| CN | 108283520 B | 10/2022 |
| CN | 110547865 B | 10/2022 |
| CN | 107343816 B | 11/2022 |
| CN | 115281680 A | 11/2022 |
| CN | 115444549 A | 12/2022 |
| CN | 107343784 B | 2/2023 |
| CN | 110520067 B | 5/2023 |
| CN | 116158839 A | 5/2023 |
| CN | 106419897 B | 6/2023 |
| CN | 111657866 B | 10/2023 |
| CN | 112704546 B | 3/2024 |
| CN | 118384409 A | 7/2024 |
| EP | 0779059 A1 | 6/1997 |
| EP | 0889744 B1 | 1/2004 |
| EP | 1254641 B1 | 11/2008 |
| EP | 1690564 B1 | 4/2009 |
| EP | 1723981 B1 | 8/2010 |
| EP | 2135634 B1 | 10/2011 |
| EP | 2018203 B1 | 6/2012 |
| EP | 1814450 B1 | 1/2013 |
| EP | 2269532 B1 | 3/2013 |
| EP | 2664295 A1 | 11/2013 |
| EP | 2604306 B1 | 1/2014 |
| EP | 2732843 A1 | 5/2014 |
| EP | 2747680 A2 | 7/2014 |
| EP | 2752153 A1 | 7/2014 |
| EP | 2792322 A1 | 10/2014 |
| EP | 2792323 A1 | 10/2014 |
| EP | 2796103 A1 | 10/2014 |
| EP | 2907462 A1 | 8/2015 |
| EP | 2915555 A1 | 9/2015 |
| EP | 3023052 A1 | 5/2016 |
| EP | 1968679 B1 | 9/2016 |
| EP | 2241279 B1 | 9/2016 |
| EP | 3111871 A1 | 1/2017 |
| EP | 3111872 A1 | 1/2017 |
| EP | 3114987 A1 | 1/2017 |
| EP | 2796103 B1 | 2/2017 |
| EP | 3222209 A1 | 9/2017 |
| EP | 2792322 B1 | 10/2017 |
| EP | 2792323 B1 | 10/2017 |
| EP | 3115076 A4 | 10/2017 |
| EP | 3117863 A4 | 10/2017 |
| EP | 3030182 B1 | 1/2018 |
| EP | 3287092 A1 | 2/2018 |
| EP | 3111871 B1 | 3/2018 |
| EP | 3111872 B1 | 4/2018 |
| EP | 3057488 B1 | 5/2018 |
| EP | 2848226 B1 | 7/2018 |
| EP | 3345540 A1 | 7/2018 |
| EP | 3363397 A1 | 8/2018 |
| EP | 3391928 A1 | 10/2018 |
| EP | 3122276 B1 | 11/2018 |
| EP | 3398549 A1 | 11/2018 |
| EP | 3403571 A1 | 11/2018 |
| EP | 1759668 B1 | 12/2018 |
| EP | 3020352 B1 | 12/2018 |
| EP | 3037122 B1 | 12/2018 |
| EP | 2234537 B1 | 1/2019 |
| EP | 2569040 B1 | 2/2019 |
| EP | 3023052 B1 | 3/2019 |
| EP | 3073908 B1 | 4/2019 |
| EP | 3466363 A1 | 4/2019 |
| EP | 2550989 B1 | 6/2019 |
| EP | 3512589 A1 | 7/2019 |
| EP | 3512590 A1 | 7/2019 |
| EP | 3527125 A1 | 8/2019 |
| EP | 3531903 A1 | 9/2019 |
| EP | 3434218 B1 | 2/2020 |
| EP | 2908723 B1 | 3/2020 |
| EP | 3335658 B1 | 4/2020 |
| EP | 3073907 B1 | 6/2020 |
| EP | 3114987 B1 | 8/2020 |
| EP | 3178516 B1 | 9/2020 |
| EP | 3708104 A1 | 9/2020 |
| EP | 3711662 A1 | 9/2020 |
| EP | 3721796 A1 | 10/2020 |
| EP | 3738508 A1 | 11/2020 |
| EP | 3738509 A1 | 11/2020 |
| EP | 3340916 B1 | 12/2020 |
| EP | 3579908 B1 | 12/2020 |
| EP | 3750475 A1 | 12/2020 |
| EP | 2155301 B1 | 4/2021 |
| EP | 3432820 B1 | 4/2021 |
| EP | 3579758 B1 | 5/2021 |
| EP | 2809254 B1 | 6/2021 |
| EP | 3508245 B1 | 7/2021 |
| EP | 3858277 A1 | 8/2021 |
| EP | 3791820 B9 | 4/2022 |
| EP | 4000506 A1 | 5/2022 |
| EP | 3153124 B1 | 7/2022 |
| EP | 4039215 A1 | 8/2022 |
| EP | 3363397 B1 | 9/2022 |
| EP | 3609414 B1 | 11/2022 |
| EP | 4101372 A1 | 12/2022 |
| EP | 2844193 B1 | 1/2023 |
| EP | 3100696 B1 | 1/2023 |
| EP | 3166524 B1 | 1/2023 |
| EP | 4134032 A1 | 2/2023 |
| EP | 3115076 B1 | 3/2023 |
| EP | 4179991 A1 | 5/2023 |
| EP | 2803329 B1 | 6/2023 |
| EP | 3015064 B1 | 6/2023 |
| EP | 3141183 B1 | 6/2023 |
| EP | 3398549 B1 | 6/2023 |
| EP | 4190232 A1 | 6/2023 |
| EP | 2816966 B1 | 10/2023 |
| EP | 3113671 B1 | 10/2023 |
| EP | 3738509 B1 | 10/2023 |
| EP | 3209234 B1 | 11/2023 |
| EP | 3527125 B1 | 11/2023 |
| EP | 3721796 B1 | 11/2023 |
| EP | 4233699 A3 | 11/2023 |
| EP | 4272631 A2 | 11/2023 |
| EP | 3192442 B1 | 1/2024 |
| EP | 4298995 A2 | 1/2024 |
| EP | 3738508 B1 | 2/2024 |
| EP | 3124069 B1 | 4/2024 |
| EP | 4364765 A2 | 5/2024 |
| EP | 3498156 B1 | 6/2024 |
| EP | 3573559 B1 | 7/2024 |
| EP | 4205685 B1 | 8/2024 |
| EP | 4417112 A2 | 8/2024 |
| EP | 3629964 B1 | 9/2024 |
| EP | 3184035 B1 | 10/2024 |
| EP | 4417112 A3 | 11/2024 |
| EP | 4101372 B1 | 12/2024 |
| EP | 2915555 B1 | 2/2025 |
| IL | 246415 B | 12/2019 |

(56) References Cited

FOREIGN PATENT DOCUMENTS

| | | |
|---|---|---|
| IN | 201614021431 A | 12/2016 |
| IN | 201614021432 A | 12/2016 |
| IN | 201614021450 A | 12/2016 |
| JP | 08511438 A | 12/1996 |
| JP | 2002126096 A | 5/2002 |
| JP | 2009500052 A | 1/2009 |
| JP | 2010057943 A | 3/2010 |
| JP | 4545384 B2 | 7/2010 |
| JP | 2011507656 A | 3/2011 |
| JP | 4887810 B2 | 2/2012 |
| JP | 4940332 B2 | 3/2012 |
| JP | 2012055602 A | 3/2012 |
| JP | 2012130392 A | 7/2012 |
| JP | 2012200509 A | 10/2012 |
| JP | 5154031 B2 | 2/2013 |
| JP | 5193190 B2 | 5/2013 |
| JP | 5372314 B2 | 12/2013 |
| JP | 2014014713 A | 1/2014 |
| JP | 5550150 B2 | 5/2014 |
| JP | 2014512226 A | 5/2014 |
| JP | 5762697 B2 | 6/2015 |
| JP | 5856712 B2 | 2/2016 |
| JP | 5908270 B2 | 4/2016 |
| JP | 5944331 B2 | 7/2016 |
| JP | 6050522 B2 | 12/2016 |
| JP | 6059737 B2 | 12/2016 |
| JP | 2017012750 A | 1/2017 |
| JP | 2017012755 A | 1/2017 |
| JP | 2017038919 A | 2/2017 |
| JP | 2017051211 A | 3/2017 |
| JP | 2017104552 A | 6/2017 |
| JP | 6246742 B2 | 12/2017 |
| JP | 6342524 B2 | 6/2018 |
| JP | 6434495 B2 | 12/2018 |
| JP | 6445509 B2 | 12/2018 |
| JP | 6445742 B1 | 12/2018 |
| JP | 6466114 B2 | 2/2019 |
| JP | 6479005 B2 | 2/2019 |
| JP | 6515084 B2 | 5/2019 |
| JP | 6528010 B1 | 6/2019 |
| JP | 6655655 B2 | 2/2020 |
| JP | 6746734 B2 | 8/2020 |
| JP | 6776021 B2 | 10/2020 |
| JP | 6776025 B2 | 10/2020 |
| JP | 6786275 B2 | 11/2020 |
| JP | 6821812 B2 | 1/2021 |
| JP | 2021007772 A | 1/2021 |
| JP | 6843502 B2 | 3/2021 |
| JP | 6894004 B2 | 6/2021 |
| JP | 6920312 B2 | 8/2021 |
| JP | 6926306 B2 | 8/2021 |
| JP | 6932484 B2 | 8/2021 |
| JP | 6936872 B2 | 9/2021 |
| JP | 6980386 B2 | 11/2021 |
| JP | 2022020838 A | 2/2022 |
| JP | 7101228 B2 | 7/2022 |
| JP | 7102558 B2 | 7/2022 |
| JP | 7106301 B2 | 7/2022 |
| JP | 2023002720 A | 1/2023 |
| JP | 7220242 B2 | 2/2023 |
| JP | 7230168 B2 | 2/2023 |
| JP | 7242816 B2 | 3/2023 |
| JP | 7246319 B2 | 3/2023 |
| JP | 2023027202 A | 3/2023 |
| JP | 2023033335 A | 3/2023 |
| JP | 7262919 B2 | 4/2023 |
| JP | 7275333 B2 | 5/2023 |
| JP | 7292822 B2 | 6/2023 |
| JP | 7400050 B2 | 12/2023 |
| JP | 7465944 B2 | 4/2024 |
| JP | 7530317 B2 | 8/2024 |
| JP | 2024103761 A | 8/2024 |
| JP | 7628563 B2 | 2/2025 |
| JP | 2025026734 A | 2/2025 |
| JP | 2025026852 A | 2/2025 |
| JP | 2025027101 A | 2/2025 |
| JP | 7641330 B2 | 3/2025 |
| JP | 7646980 B2 | 4/2025 |
| RU | 2016124794 A | 12/2017 |
| RU | 2016124801 A | 12/2017 |
| RU | 2016125763 A | 1/2018 |
| WO | 9421166 A1 | 9/1994 |
| WO | 9843530 A1 | 10/1998 |
| WO | 0168178 A1 | 9/2001 |
| WO | 2004112629 A1 | 12/2004 |
| WO | 2005114720 A2 | 12/2005 |
| WO | 2007001981 A2 | 1/2007 |
| WO | 2008091197 A1 | 7/2008 |
| WO | 2008157399 A1 | 12/2008 |
| WO | 2011075328 A1 | 6/2011 |
| WO | 2012092016 A1 | 7/2012 |
| WO | 2012145072 A1 | 10/2012 |
| WO | 2013131046 A1 | 9/2013 |
| WO | 2014113612 A1 | 7/2014 |
| WO | 2015057521 A1 | 4/2015 |
| WO | 2015095577 A1 | 6/2015 |
| WO | 2015130824 A1 | 9/2015 |
| WO | 2016001015 A1 | 1/2016 |
| WO | 2016090175 A1 | 6/2016 |
| WO | 2017098198 A1 | 6/2017 |
| WO | 2018053148 A1 | 3/2018 |
| WO | 2018053164 A1 | 3/2018 |
| WO | 2018136741 A1 | 7/2018 |

OTHER PUBLICATIONS

Baumgartner et al., "The Electrodeposition of Platinum and Platinum Alloys", Platinum Metals Review, vol. 32, No. 4, 1988, pp. 188-197.

Ohno et al., "Electroless Deposition of Palladium and Platinum", Modern Electroplating, 5th Edition, Chapter 20, Oct. 4, 2010, pp. 477-482.

Rao et al., "Chemical and Electrochemical Depositions of Platinum Group Metals and their Applications", Coordination Chemistry Reviews, vol. 249, No. 5-6, Mar. 2005, pp. 613-631.

Sheela et al., "Electrodeposition of Iridium", Bulletin of Electrochemistry, vol. 15, No. 5-6, May-Jun. 1999, pp. 208-210.

Wu et al., "Characterization of Electroplated Platinum-Iridium Alloys on the Nickel-Base Single Crystal Superalloy", Materials Transactions, vol. 46, No. 10, 2005, pp. 2176-2179.

Wu et al., "Electrodeposition of Platinum-Iridium Alloy on Nickel-Base Single-Crystal Superalloy TMS75", Surface and Coatings Technology, vol. 184, No. 1, Jun. 2004, pp. 24-30.

\* cited by examiner

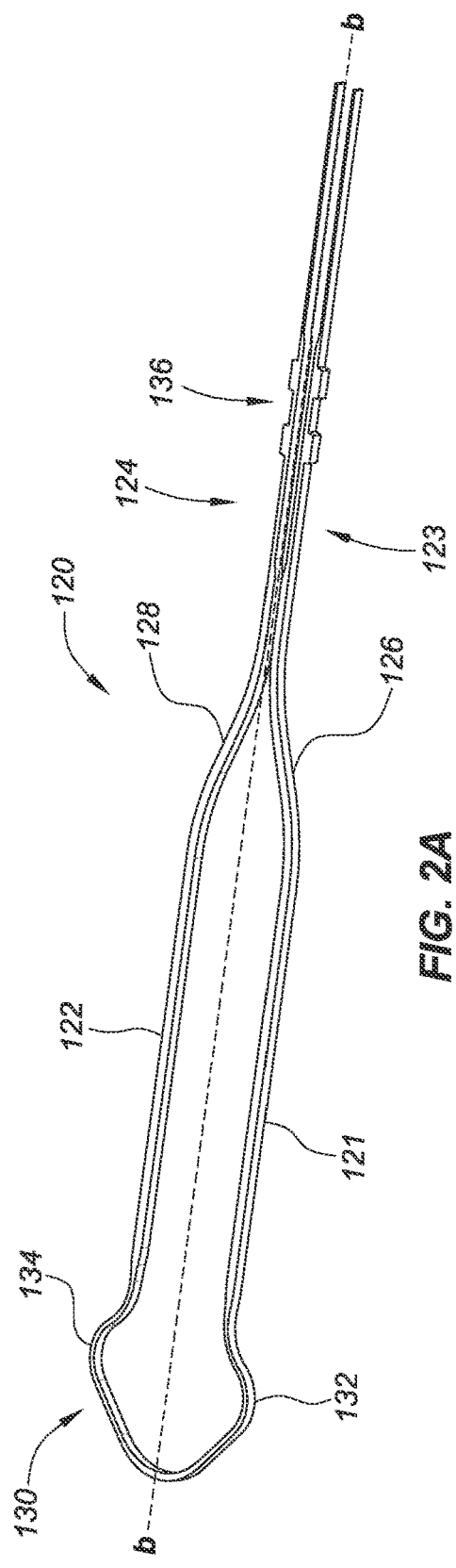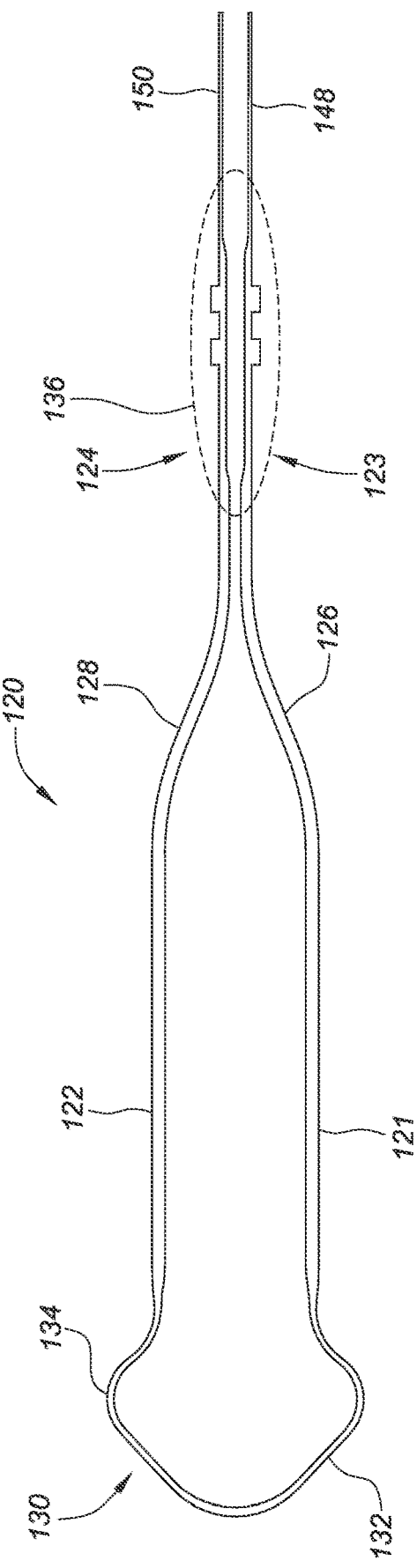
FIG. 2A
FIG. 2B

LAYERED HIGH DENSITY ELECTRODE MAPPING CATHETER

CROSS REFERENCE TO RELATED APPLICATION DATA

The present application is a Continuation of U.S. patent application Ser. No. 16/029,038 filed Jul. 6, 2018 (now U.S. Pat. No. 11,433,220); which claims the benefit of U.S. Provisional Appln No. 62/529,586 filed Jul. 7, 2017; the full disclosures which are incorporated herein by reference in their entirety for all purposes.

FIELD OF THE INVENTION

This disclosure relates to a layered high density electrode mapping catheter.

BACKGROUND OF THE INVENTION

Catheters have been used for cardiac medical procedures for many years. Catheters can be used, for example, to diagnose and treat cardiac arrhythmias, while positioned at a specific location within a body that is otherwise inaccessible without a more invasive procedure.

Conventional mapping catheters may include, for example, a plurality of adjacent ring electrodes encircling the longitudinal axis of the catheter and constructed from platinum or some other metal. These ring electrodes are relatively rigid. Similarly, conventional ablation catheters may comprise a relatively rigid tip electrode for delivering therapy (e.g., delivering RF ablation energy) and may also include a plurality of adjacent ring electrodes. It can be difficult to maintain good electrical contact with cardiac tissue when using these conventional catheters and their relatively rigid (or nonconforming), metallic electrodes, especially when sharp gradients and undulations are present.

Whether mapping or forming lesions in a heart, the beating of the heart, especially if erratic or irregular, complicates matters, making it difficult to keep adequate contact between electrodes and tissue for a sufficient length of time. These problems are exacerbated on contoured or trabeculated surfaces. If the contact between the electrodes and the tissue cannot be sufficiently maintained, quality lesions or accurate mapping are unlikely to result.

The foregoing discussion is intended only to illustrate the present field and should not be taken as a disavowal of claim scope.

BRIEF SUMMARY

Various embodiments of the present disclosure can include flexible catheter tip. The flexible catheter tip can include an inboard understructure that defines a tip longitudinal axis, wherein the inboard understructure can be formed from a first continuous element that includes a first rectangular cross-section. An intermediate inboard covering can be disposed about the first continuous element that forms a distal portion of the inboard understructure. An outboard understructure can extend along the tip longitudinal axis, wherein the outboard understructure can be formed from a second continuous element that includes a second rectangular cross-section. An intermediate outboard covering can be disposed about the second continuous element that forms a distal portion of the outboard understructure.

Various embodiments of the present disclosure can include a flexible catheter tip. The flexible catheter tip can include a flexible understructure that defines a tip longitudinal axis, wherein the flexible understructure is formed from a first continuous element that includes a first rectangular cross-section. The flexible catheter tip can include an intermediate covering disposed about the first continuous element. The flexible catheter tip can include a covering disposed over the intermediate covering, such that the intermediate covering is disposed between the covering and the flexible understructure.

Various embodiments of the present disclosure can include a flexible catheter tip. The flexible catheter tip can include an inboard understructure that defines a tip longitudinal axis, wherein the inboard understructure is formed from a first continuous element that includes a first rectangular cross-section, the first continuous element defining first and second inboard arm understructures and a flared head portion connected to a distal end of each of the first and second inboard arm understructures. The flexible catheter tip can include an intermediate inboard covering disposed about the flared head portion. The flexible catheter tip can include an outboard understructure that extends along the tip longitudinal axis, wherein the outboard understructure is formed from a second continuous element that includes a second rectangular cross-section, the second continuous element defining first and second outboard arm understructures and a head portion connected to a distal end of each of the first and second outboard arm understructures. The flexible catheter tip can include an intermediate outboard covering disposed about the second continuous element that forms the head portion.

BRIEF DESCRIPTION OF THE DRAWINGS

FIG. 2A is an isometric side and top view of an inboard understructure of a high density electrode mapping catheter in FIG. 1A, according to various embodiments of the present disclosure.

FIG. 2B is a top view of the inboard understructure depicted in FIG. 2A, according to various embodiments of the present disclosure.

DETAILED DESCRIPTION

The contents of International Application No. PCT/US2014/011940, published as WO 2014/113612, entitled Flexible High-Density Mapping Catheter Tips and Flexible Ablation Catheter Tips with Onboard High-Density Mapping Electrodes and U.S. patent application Ser. No. 15/331,369, now U.S. Pat. No. 10,362,954, entitled High Density Electrode Mapping Catheter are hereby incorporated by reference as though fully set forth herein.

Figure 1A:
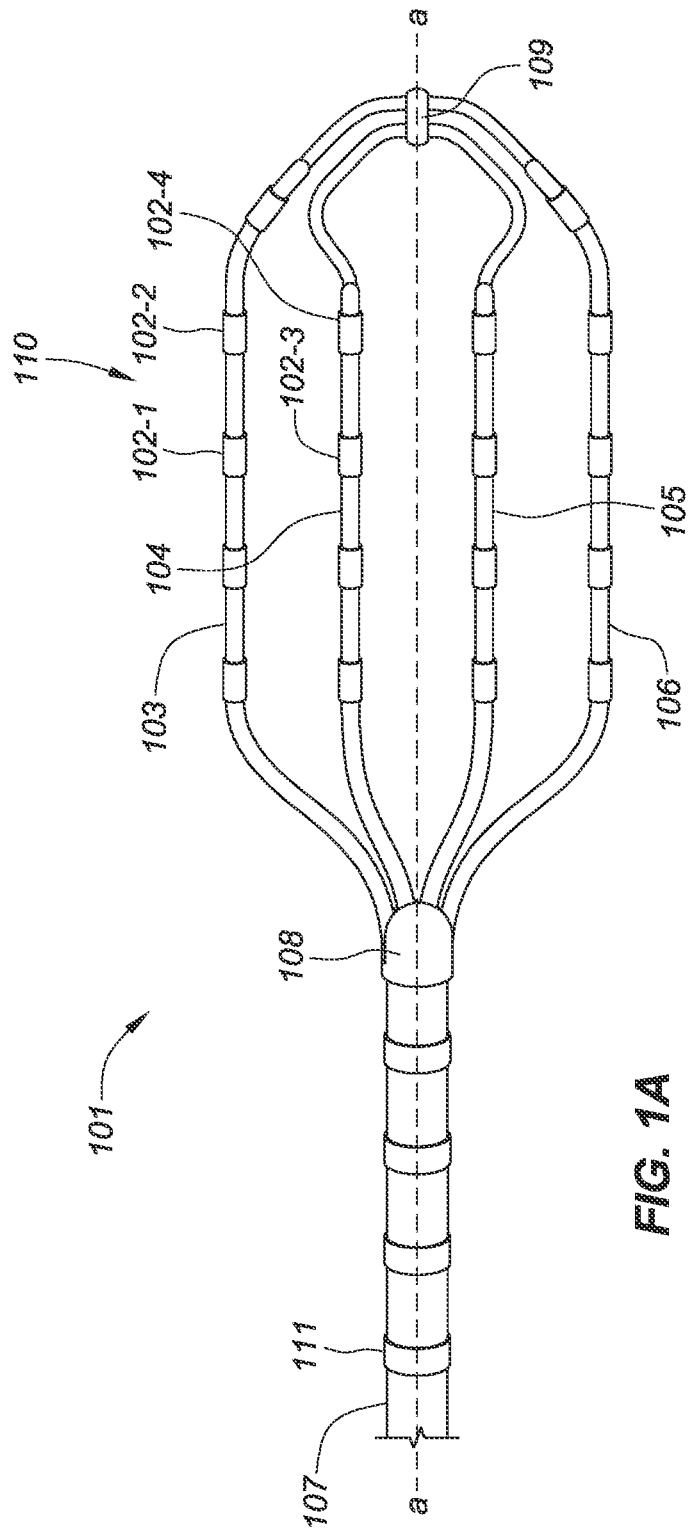
FIG. 1A is a top view of a high density electrode mapping catheter, according to various embodiments of the present disclosure.
Figure 1B:
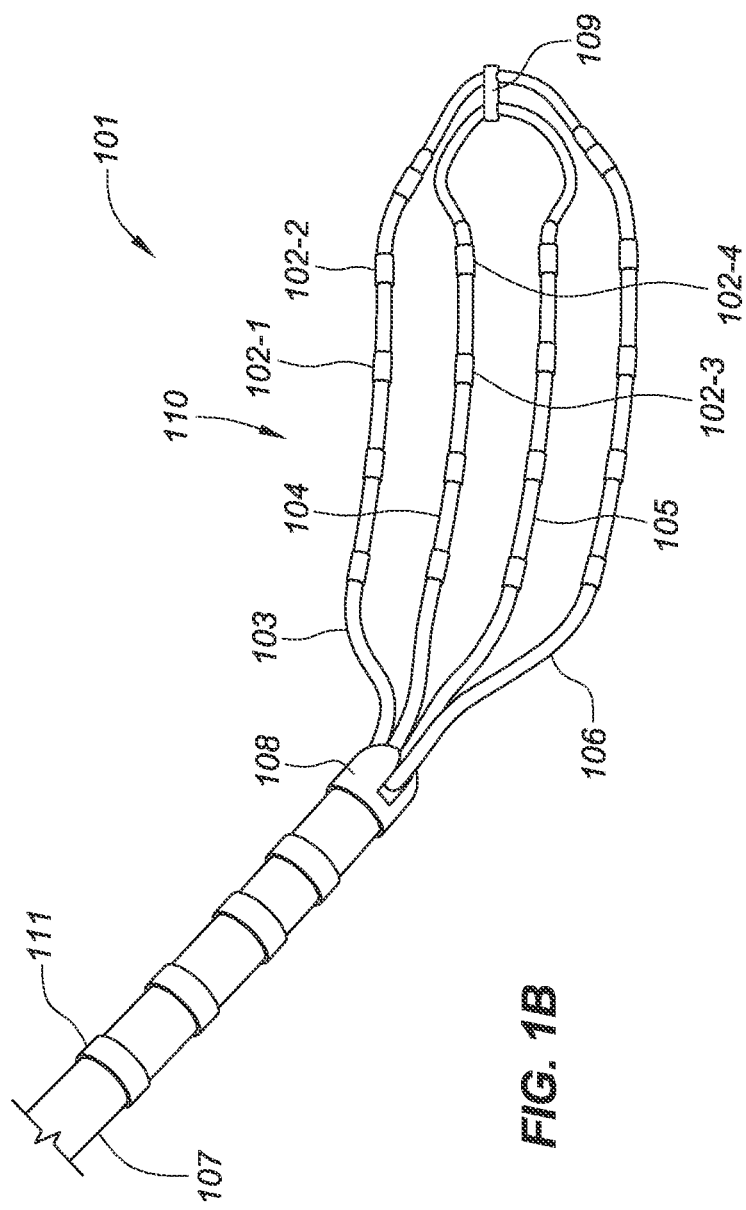
FIG. 1B is an isometric side and top view of the high density electrode mapping catheter in FIG. 1A, according to various embodiments of the present disclosure.

FIG. 1A is a top view of a high density electrode mapping catheter 101 and FIG. 1B is an isometric side and top view of the high density electrode mapping catheter 101, according to various embodiments of the present disclosure. In some embodiments, the high density electrode mapping catheter 101 can include a flexible tip portion 110 that forms a flexible array of microelectrodes 102-1, 102-2, 102-3, 102-4. Hereinafter, microelectrodes 102-1, 102-2, 102-3, 102-4 are referred to in the plural as microelectrodes 102. For ease of reference, only four microelectrodes 102 are labeled in FIG. 1A, however, the high density mapping catheter 101 can include more than four microelectrodes, as depicted. This planar array (or 'paddle' configuration) of microelectrodes 102 comprises four side-by-side, longitudinally-extending arms 103, 104, 105, 106, which can form a flexible framework on which the microelectrodes 102 are disposed. The four microelectrode-carrier arms comprise a first outboard arm 103, a second outboard arm 106, a first inboard arm 104, and a second inboard arm 105, which can be connected via a distal coupler 109. These arms can be laterally separated from each other.

Each of the four arms can carry a plurality of microelectrodes 102. For example, each of the four arms can carry microelectrodes 102 spaced along a length of each of the four arms. Although each of the high density electrode mapping catheters 101 depicted in FIGS. 1A and 1B depict four arms, the high density electrode mapping catheters 101 could comprise more or fewer arms. Additionally, while the high density electrode mapping catheter 101 depicted in FIGS. 1A and 1B is depicted as including 18 electrodes (e.g., 5 microelectrodes on first outboard arm 103 and second outboard arm 106 and 4 microelectrodes on first inboard arm 104 and second inboard arm 105), the catheters can include more or fewer than 18 electrodes. In addition, the first outboard arm 103 and second outboard arm 106 can include more or fewer than 5 microelectrodes and the first inboard arm 104 and second inboard arm 105 can include more or fewer than 4 microelectrodes).

In some embodiments, the microelectrodes 102 can be used in diagnostic, therapeutic, and/or mapping procedures. For example and without limitation, the microelectrodes 102 can be used for electrophysiological studies, pacing, cardiac mapping, and/or ablation. In some embodiments, the microelectrodes 102 can be used to perform unipolar or bipolar ablation. This unipolar or bipolar ablation can create specific lines or patterns of lesions. In some embodiments, the microelectrodes 102 can receive electrical signals from the heart, which can be used for electrophysiological studies. In some embodiments, the microelectrodes 102 can perform a location or position sensing function related to cardiac mapping.

In some embodiments, the high density electrode mapping catheter 101 can include a catheter shaft 107. The catheter shaft 107 can include a proximal end and a distal end. The distal end can include a connector 108, which can couple the distal end of the catheter shaft 107 to a proximal end of the planar array. The catheter shaft 107 can define a catheter shaft longitudinal axis aa, as depicted in FIG. 1A, along which the first outboard arm 103, first inboard arm 104, second inboard arm 105, and second outboard arm 106 can generally extend parallel in relation therewith. The catheter shaft 107 can be made of a flexible material, such that it can be threaded through a tortuous vasculature of a patient. In some embodiments, the catheter shaft 107 can include one or more ring electrodes 111 disposed along a length of the catheter shaft 107. The ring electrodes 111 can be used for diagnostic, therapeutic, and/or mapping procedures, in an example.

As depicted in FIG. 1B, the flexible tip portion 110 can be adapted to conform to tissue (e.g., cardiac tissue). For example, when the flexible tip portion 110 contacts tissue, the flexible tip portion 110 can deflect, allowing the flexible framework to conform to the tissue. In some embodiments, the arms (or the understructure of the arms) comprising the paddle structure (or multi-arm, electrode-carrying, flexible framework) at the distal end of the catheters depicted in FIGS. 1A and 1B can be laser cut from a flexible or spring-like material such as Nitinol and/or a flexible substrate, as discussed herein. In some embodiments, the arms (or the understructure of the arms) can be formed from a sheet of metal (e.g., Nitinol) with a uniform thickness. Different portions of the arms (or understructure of the arms) can be formed from the sheet (e.g., cut) such that the different portions of the arms have varying widths. The construction (including, for example, the length and/or diameter of the arms) and material of the arms can be adjusted or tailored to create, for example, desired resiliency, flexibility, foldability, conformability, and stiffness characteristics, including one or more characteristics that may vary from the proximal end of a single arm to the distal end of that arm, or between or among the plurality of arms comprising a single paddle structure. The foldability of materials such as Nitinol and/or another type of flexible substrate provide the additional advantage of facilitating insertion of the paddle structure into a delivery catheter or introducer, whether during delivery of the catheter into the body or removal of the catheter from the body at the end of a procedure.

In some embodiments, the arms can have a rectangular cross-section and can have defined edges. The arms can be housed in an atraumatic covering, which can be a thin-walled polymer (e.g., urethane) extrusion. The atraumatic covering can prevent the edges of the arms from contacting tissue, thus preventing damage to the tissue. In some embodiments, as the arms flex as a result of contact with tissue and/or from deployment from a sheath, the arms and in particular the edges of the arms can contact the atraumatic covering. Contact between the edges of the arms and the atraumatic covering can cause wear to the atraumatic covering and can eventually cause holes to be formed in the atraumatic covering. As further discussed herein, embodiments of the present disclosure can provide a solution to this potential occurrence. Additionally, embodiments, of the present disclosure can prevent a stretching/shrinking of the atraumatic covering, which can decrease an amount of wear caused to the atraumatic covering.

Among other things, the disclosed catheters, with their plurality of microelectrodes, are useful to (1) define regional propagation maps of particularly sized areas (e.g., one centimeter square areas) within the atrial walls of the heart; (2) identify complex fractionated atrial electrograms for ablation; (3) identify localized, focal potentials between the microelectrodes for higher electrogram resolution; and/or (4) more precisely target areas for ablation. These mapping catheters and ablation catheters are constructed to conform to, and remain in contact with, cardiac tissue despite potentially erratic cardiac motion. Such enhanced stability of the catheter on a heart wall during cardiac motion provides more accurate mapping and ablation due to sustained tissue-electrode contact. Additionally, the catheters described herein may be useful for epicardial and/or endocardial use. For example, the planar array embodiments depicted herein may be used in an epicardial procedure where the planar array of microelectrodes is positioned between the myocardial surface and the pericardium. Alternatively the planar array embodiments may be used in an endocardial procedure to quickly sweep and/or analyze the inner surfaces of the myocardium and quickly create high-density maps of the heart tissue's electrical properties.

FIG. 2A is an isometric side and top view of an inboard understructure 120 (also referred to herein as inner understructure) of the high density electrode mapping catheter depicted in FIG. 1A, according to various embodiments of the present disclosure. In some embodiments, the inboard understructure 120 can be formed from a flexible or spring-like material such as Nitinol and/or a flexible substrate, as discussed herein. In an example, the inboard understructure can be cut from a planar sheet of material (e.g., planar substrate). The inboard understructure 120 can include a first inboard arm understructure 121 and a second inboard arm understructure 122. Although not shown, the outboard understructure (also referred to herein as outer understructure) that provides the understructure for the first outboard arm 103 and the second outboard arm 106 can be formed and/or processed in a manner analogous to that discussed in relation to the inboard understructure 120. Further, if the high density electrode mapping catheter includes additional arms, those arms can be formed and/or processed in a manner analogous to that discussed in relation to the inboard understructure 120. For the sake of brevity, discussion is directed towards the inboard understructure 120. As depicted, the inboard understructure 120 can include a first proximal inboard mounting arm 123 and a second proximal inboard mounting arm 124. The proximal inboard mounting arms can be inserted into a distal end of the catheter 107 and through the connector 108 and can be used to connect the flexible tip portion 110 to the distal end of the catheter 107.

In some embodiments, the proximal inboard mounting arms can be inserted through a torsional spacer, as discussed herein.

In some embodiments, the inboard understructure 120 can define a tip longitudinal axis, depicted by line bb. In some embodiments, the inboard understructure 120 can be formed from a continuous element that includes a first rectangular cross-section. As used herein, a rectangular cross-section can include a square cross-section. For example, the inboard understructure 120 can include the first proximal inboard mounting arm 123 and second proximal inboard mounting arm 124, which can extend along the longitudinal axis. The inboard understructure 120 can include a first inboard arm understructure 121 that extends distally from the first proximal inboard mounting arm 123 and can include a second inboard arm understructure 122 that extends distally from the second proximal inboard mounting arm 124. In some embodiments, the first inboard arm understructure 121 and the second inboard arm understructure 122 can extend parallel to the tip longitudinal axis bb and to one another.

In some embodiments, a first transition understructure portion 126 can be disposed between the first proximal inboard mounting arm 123 and the first inboard arm understructure 121. The first transition understructure portion 126 can be laterally flared away from the tip longitudinal axis bb. Additionally, a second transition understructure portion 127 can be disposed between the second proximal inboard mounting arm 124 and the second inboard arm understructure 122. The second transition understructure portion 128 can be laterally flared away from the tip longitudinal axis bb. In an example, the first transition understructure portion 126 and the second transition understructure portion 128 can be flared away from one another.

In some embodiments, the inboard understructure 120 includes a flared head portion 130 that is connected to distal ends of the first and second inboard arm understructures 121, 122. In some embodiments, the flared head portion 130 can be formed from a first flared element 132 and a second flared element 134. As the first flared element 132 and the second flared element 134 extend distally, the elements 132, 134 can be laterally flared away from the tip longitudinal axis bb and away from one another, before extending toward the tip longitudinal axis bb and toward one another. The first flared element 132 and the second flared element 134 can be connected along the tip longitudinal axis bb. In an example, the inboard understructure can be symmetrical along either side of the tip longitudinal axis bb.

In some embodiments, the proximal portion of the inboard frame understructure 120 can include the first proximal inboard mounting arm 123 and the second proximal inboard mounting arm 124. In an example, the proximal portion of the inboard frame understructure 120 can include an inboard frame lock portion 136.

FIG. 2B depicts a top view of the inboard understructure 120 depicted in FIG. 2A, according to various embodiments of the present disclosure. FIG. 2B depicts the inboard frame lock portion 136 of the proximal inboard portion of the inboard frame understructure 120. In some embodiments, a distal end of the first proximal inboard mounting arm 123 and the second proximal inboard mounting arm 124 can be connected to a proximal end of the first transition understructure portion 126 and the second transition understructure portion 128, respectively. The first proximal inboard mounting arm 123 can have a reduced lateral width with respect to the first transition understructure portion 126 and the second proximal inboard mounting arm 124 can have a reduced lateral width with respect to the second transition understructure portion 128. In an example, the transition understructure portions 126, 128 and the proximal inboard mounting arms 123, 124 can be tapered at a tapered transition area between the two elements, as further depicted in FIG. 2C.

In some embodiments, a proximal end of the inboard frame lock portion 136 can be connected to a proximal tail portion that includes a first proximal tail 148 and a second proximal tail 150. The first proximal tail 148 can be connected to the first proximal inboard mounting arm 123 and the second proximal tail 150 can be connected to the second proximal inboard mounting arm 124.

As previously discussed, each portion of the inboard frame understructure 120 (FIG. 2A, 2B), including the proximal tails 148, 150, proximal inboard mounting arms 123, 124, inboard arm understructures 121, 122, and flared head portion 130 can be formed from a planar substrate. For example, the planar substrate can have a rectangular cross-section, which can be beneficial, as further described herein. In some approaches, high density electrode mapping catheters can be assembled using tubular subassemblies for the inboard understructure and the outboard understructure. One reason for the use of tubing when assembling the understructures is to allow wire to be threaded through the tubing for connection of each individual microelectrode. This process can be labor and/or cost intensive, since each wire may be individually threaded through the tubing and individually connected with each microelectrode. Further, ensuring that a reliable electrical connection is established between each microelectrode and its wire can be challenging.

In addition, use of tubing can result in a less predictable deflection of the flexible tip portion since the walls of the tubing may be symmetrical and are not biased to bend in a particular manner. Embodiments of the present disclosure can provide for a more predictable deflection of the flexible tip portion 110. In addition, embodiments of the present disclosure can maintain a lateral spacing between electrodes disposed on the inboard understructure and an outboard understructure, as further discussed herein. However, a byproduct of the planar substrate (e.g., having a rectangular cross-section) can include contact between the edges of the arms and an atraumatic covering that houses the planar substrate, which can cause wear to the atraumatic covering and can eventually cause holes to be formed in the atraumatic covering. Embodiments of the present disclosure can provide a solution to this potential occurrence.

As depicted in FIGS. 2A and 2B, the inboard understructure 120 (and although not depicted, the outboard understructure) can be formed from a planar piece of material. In an example, the inboard understructure 120 (and the outboard understructure) can be formed from an understructure with a rectangular and/or square shaped cross-section. In some embodiments, the inboard understructure 120 and/or the outboard understructure can be a continuous element that is formed from a single unitary piece of material. As used herein, a rectangular cross-section can be defined as a cross-section having a greater width than thickness. However, in some embodiments, a rectangular cross-section can include a cross-section having a greater thickness than width. As used herein, a square cross-section can be defined as a cross-section having a same width and thickness.

Figure 3:
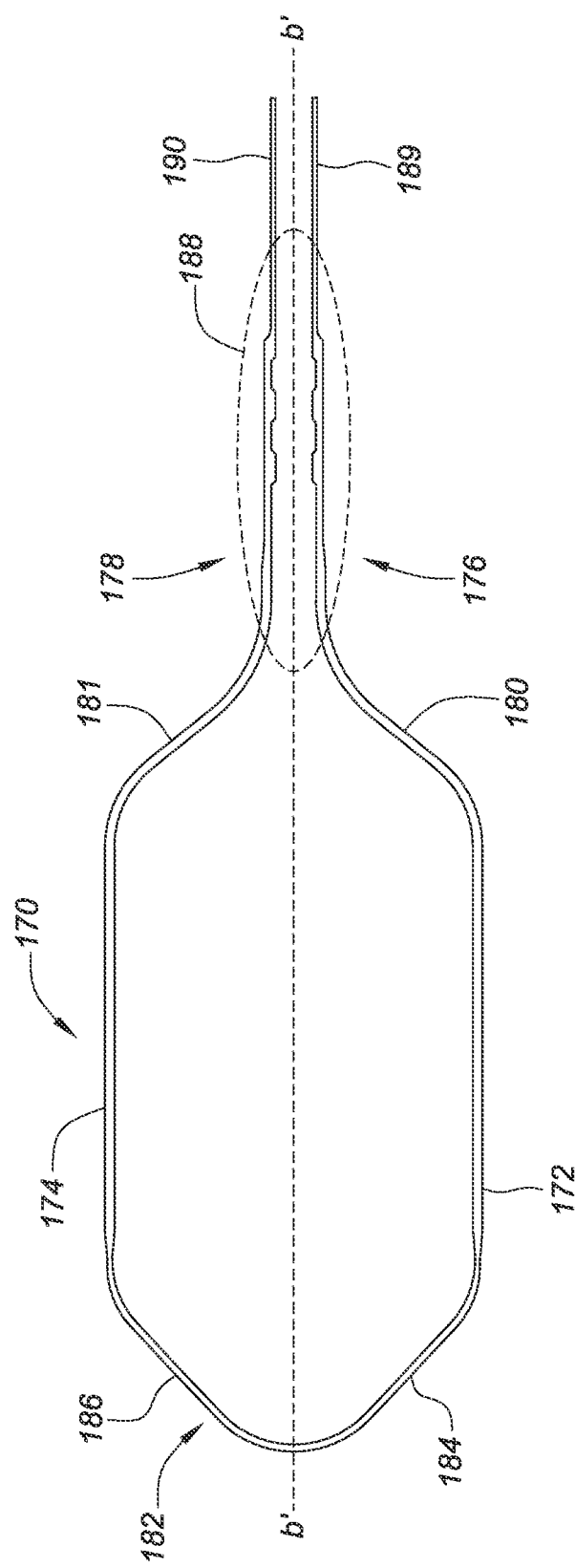
FIG. 3 is a top view of an outboard understructure of a high density electrode mapping catheter depicted in FIG. 1A, according to various embodiments of the present disclosure.

FIG. 3 is a top view of an outboard understructure 170 (also referred to herein as outer understructure) of a high density electrode mapping catheter in FIG. 1A, according to various embodiments of the present disclosure. In some embodiments, the outboard understructure 170 can be formed from a flexible or spring-like material such as Nitinol and/or a flexible substrate, as previously discussed with respect to the inboard understructure. The outboard understructure 170 can include a first outboard arm understructure 172 and a second outboard arm understructure 174. As depicted, the outboard understructure 170 can include a first proximal outboard mounting arm 176 and a second proximal outboard mounting arm 178. The proximal outboard mounting arms 176, 178 can be inserted into a distal end of the catheter 107 (FIG. 1A, 1B) and can be used to connect the flexible tip portion 110 (FIG. 1A, 1B) to the distal end of the catheter 107. In some embodiments, the proximal outboard mounting arms 176, 178 can be inserted through a torsional spacer, as discussed herein.

In some embodiments, the outboard understructure 170 can define a tip longitudinal axis, depicted by line b'b'. In some embodiments, the outboard understructure 170 can be formed from a continuous element that includes a first rectangular cross-section. For example, the outboard understructure 170 can include the first proximal outboard mounting arm 176 and second proximal outboard mounting arm 178, which can extend along the tip longitudinal axis. The outboard understructure 170 can include a first outboard arm understructure 172 that extends distally from the first proximal outboard mounting arm 176 and can include a second outboard arm understructure 174 that extends distally from the second proximal outboard mounting arm 178. In some embodiments, the first outboard arm understructure 172 and the second outboard arm understructure 174 can extend parallel to the tip longitudinal axis b'b' and to one another.

In some embodiments, a first outboard transition understructure portion 180 can be disposed between the first proximal outboard mounting arm 176 and the first outboard arm understructure 172. The first outboard transition understructure portion 180 can be laterally flared away from the tip longitudinal axis b'b'. Additionally, a second outboard transition understructure portion 181 can be disposed between the second proximal outboard mounting arm 178 and the second outboard arm understructure 174. The second outboard transition understructure portion 181 can be laterally flared away from the tip longitudinal axis b'b'. In an example, the first outboard transition understructure portion 180 and the second outboard transition understructure portion 181 can be flared away from one another.

In some embodiments, the outboard understructure 170 includes a head portion 182 that is connected to distal ends of the first and second outboard arm understructures 172, 174. In some embodiments, the head portion 182 can be formed from a first tapered element 184 and a second tapered element 186 that each extend distally toward the tip longitudinal axis b'b' and converge at the longitudinal axis b'b'. In an example, the outboard understructure 170 can be symmetrical along either side of the tip longitudinal axis b'b'.

In some embodiments, the proximal portion of the outboard frame understructure 170 can include the first proximal outboard mounting arm 176 and the second proximal outboard mounting arm 178. In an example, the proximal portion of the outboard frame understructure 170 can include an outboard frame lock portion 188.

In some embodiments, a distal end of the first proximal outboard mounting arm 176 and the second proximal outboard mounting arm 178 can be connected to a proximal end of the first outboard transition understructure portion 180 and the second outboard transition understructure portion 181, respectively. The first proximal outboard mounting arm 176 can have a reduced lateral width with respect to the first outboard transition understructure portion 180 and the second proximal outboard mounting arm 178 can have a reduced lateral width with respect to the second outboard transition understructure portion 181. In an example, the outboard transition understructure portions 180, 181 and the proximal outboard mounting arms 176, 178 can be tapered at an outboard tapered transition area between the two elements.

In some embodiments, a proximal end of the outboard frame lock portion 188 can be connected to a proximal outboard tail portion that includes a first proximal outboard tail 189 and a second proximal outboard tail 190. The first proximal outboard tail 189 can be connected to the first proximal outboard mounting arm 176 and the second proximal outboard tail 190 can be connected to the second proximal outboard mounting arm 178. In an example, the proximal outboard mounting arms 176, 178 and the proximal outboard tails 189, 190 can be tapered at a tapered outboard tail transition area between the two elements.

As previously discussed, each portion of the outboard frame understructure 170, including the proximal tails 189, 190, proximal outboard mounting arms 176, 178, outboard arm understructures 172, 174, and head portion 182 can be formed from a planar substrate. For example, the planar substrate can have a rectangular cross-section, which can be beneficial, as further described herein. However, use of the planar substrate can also result in the planar substrate having defined edges, as previously discussed. As depicted in FIG. 3, the outboard understructure 170 can be formed from a planar piece of material. In an example, the outboard understructure 170 can be formed from an understructure with a rectangular and/or square shaped cross-section. In some embodiments, the outboard understructure 170 can be a continuous element that is formed from a single unitary piece of material.

Figure 4:
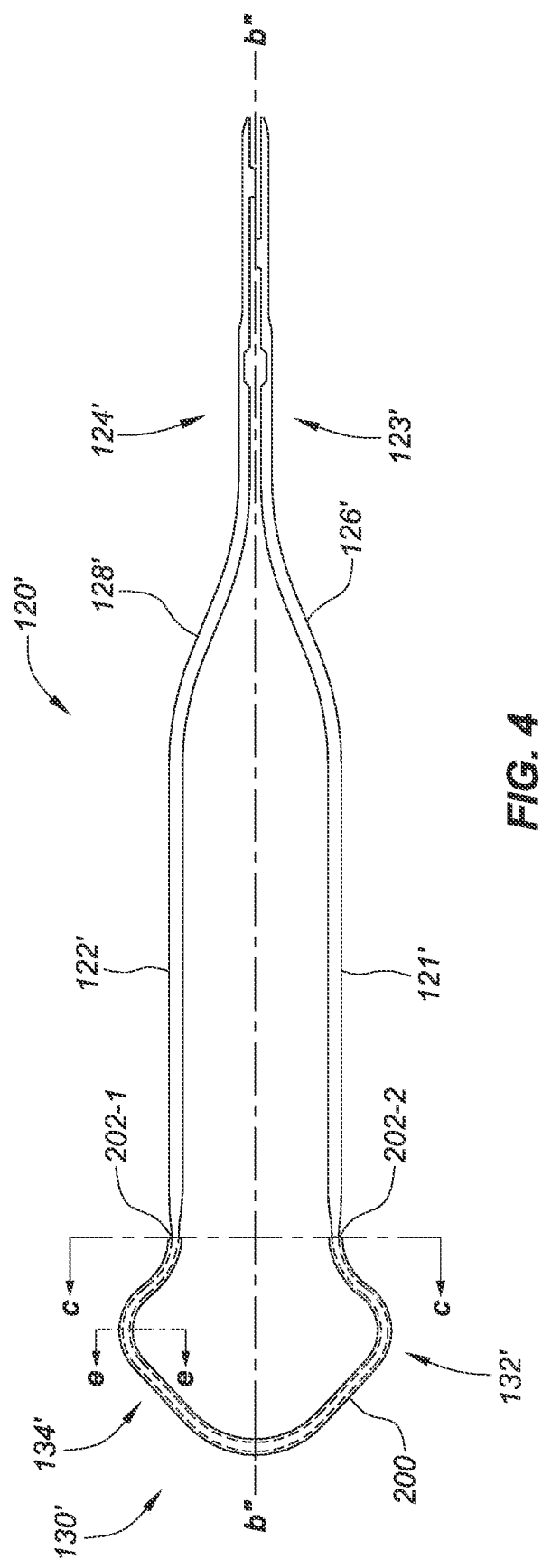
FIG. 4 is a top view of the inboard understructure depicted in FIGS. 2A and 2B with an intermediate inboard covering, according to various embodiments of the present disclosure.

FIG. 4 is a top view of the inboard understructure 120' depicted in FIGS. 2A and 2B with an intermediate inboard covering 200, according to various embodiments of the present disclosure. As previously discussed, the inboard understructure 120' can include a first inboard arm understructure 121' and a second inboard arm understructure 122' and a first proximal inboard mounting arm 123' and a second proximal inboard mounting arm 124', which can be inserted into a distal end of a catheter to secure the inboard understructure to the catheter. The first inboard arm understructure 121' can be connected to the first proximal inboard mounting arm 123' via a first transition understructure portion 126' and the second inboard arm understructure 122' can be connected to the second proximal inboard mounting arm 124' via a second transition understructure portion 128'.

The inboard understructure can include a flared head portion 130' that is connected to the distal ends of the first and second inboard arm understructures 121', 122'. The flared head portion 130' can include a first flared element 132' and a second flared element 134'. As previously discussed in relation to FIGS. 2A and 2B, as the first flared element 132 and the second flared element 134' extend distally, the elements 132', 134' can be laterally flared away from the tip longitudinal axis bb and away from one another, before extending toward the tip longitudinal axis bb" and toward one another.

In some embodiments, an intermediate inboard covering 200 can be disposed about the continuous element that forms the inboard understructure 120'. As previously discussed, the continuous element that forms the inboard understructure 120' can be formed from a planar substrate. In some embodiments, the planar substrate can have a rectangular cross-section that includes defined edges. The intermediate inboard covering 200 can be disposed about the continuous element, thus covering defined edges of the inboard understructure, as previously discussed. In some embodiments, the intermediate inboard covering 200 can be disposed about a portion of the continuous element that forms the flared head portion 130'. The flared head portion 130' can be defined as the distal end of the inboard understructure 120', which begins to laterally flare away from the tip longitudinal axis b"b". For example, the flared head portion 130' is depicted in FIG. 4 as including the portion of the inboard understructure 120' that is located to the left of (with respect to the page) the line cc (e.g., distally of line cc).

In some embodiments, the inboard understructure 120' may not include a flared head portion 130', however, the intermediate inboard covering 200 can still be disposed about a portion of the continuous element that forms the inboard understructure 120'. For example, the intermediate inboard covering 200 can be disposed over an entirety of the continuous element or can be partially disposed over a portion of the continuous element. In some embodiments, the intermediate inboard covering 200 can be disposed over the portion of the inboard understructure 120', which is not inserted in a distal end of a catheter. For example, the intermediate inboard covering 200 can be disposed over a portion of the inboard understructure 120' that is exposed and not located within the distal end of the catheter. In an example, the intermediate inboard covering can be disposed over the first transition understructure portion 126' and/or second transition understructure portion 128'. In some embodiments, the intermediate inboard covering can be disposed over the first transition understructure portion 126' and/or second transition understructure portion 128', as well as over portions of the inboard understructure 120' that are located distally to the first transition understructure portion 126' and/or second transition understructure portion 128'. In some embodiments, the intermediate inboard covering 200 can be disposed over the first inboard arm understructure 121' and second inboard arm understructure 122', as well as portions of the inboard understructure 120' that are distal to the first inboard arm understructure 121' and second inboard arm understructure 122'.

As further depicted with respect to FIG. 4, the intermediate inboard covering 200 can be disposed about the continuous element that forms the flared head portion 130'. In an example, the intermediate inboard covering 200 can be a tube that is slid over the flared head portion 130' or another portion of the inboard understructure 120'. For example, the tube can be slid over a proximal end of one of the first or second proximal inboard mounting arms 123', 124'. The tube can be cylindrical in shape, comprising a central lumen through which the continuous element that forms the inboard understructure 120' can pass. The tube can be slid along the continuous element until the tube is disposed along the portion of the continuous element that forms the flared head portion 130' or other portion of the inboard understructure 120'. The tube can be a heat shrink tube, in some embodiments. For example, the tube can be positioned along the portion of the continuous element that forms the flared head portion 130' and heat can be applied to the tube to shrink the tubing, to form the intermediate inboard covering 200. In some embodiments, the intermediate inboard covering 200 can be a coating that is applied to the continuous element that forms the flared head portion 130'. In an example, the coating can be applied via dipping the inboard understructure 120' into the coating and/or spraying the inboard understructure 120' with the coating.

In some embodiments, the intermediate inboard covering 200 can have two proximal ends 202-1, 202-2. As depicted, the two proximal ends 202-1, 202-2 are depicted as being positioned at the interface between the flared head portion 130' and the first and second inboard arm understructures 121', 122'. For example, the two proximal ends 202-1, 202-2 can be positioned where the first flared element 132' and the second flared element 134' begin to laterally flare away from the tip longitudinal axis b"b". In some embodiments, and as depicted, the proximal ends 202-1, 202-2 are positioned at a same longitudinal position along the tip long longitudinal axis b"b".

In some embodiments, the intermediate inboard covering 200 can include one layer of material (e.g., polymer, etc.) that covers a portion (e.g., flared head portion 130') of the first and/or second inboard arm understructures 121', 122'. However, in some embodiments, the intermediate inboard covering 200 can include more than one layer of material that covers the portion of the first and/or second inboard arm understructures 121', 122'. In an example, a first layer of material can cover the portion of the first and/or second inboard arm understructures 121', 122' and a second layer of material can be disposed over the first layer of material. For instance, a first layer of heat shrink material can be disposed over the portion of the first and/or second inboard arm understructures 121', 122' and a second layer of heat shrink material can be disposed over the first layer of heat shrink material.

The intermediate inboard covering 200 can serve the purpose of increasing a cross-sectional width of the continuous element and/or covering the defined edges of the planar substrate. For example, as further discussed herein, a defined edge that is covered by the intermediate inboard covering can become less defined, thus reducing an impact associated with the edge coming into contact with a tissue or other material.

Figure 5:
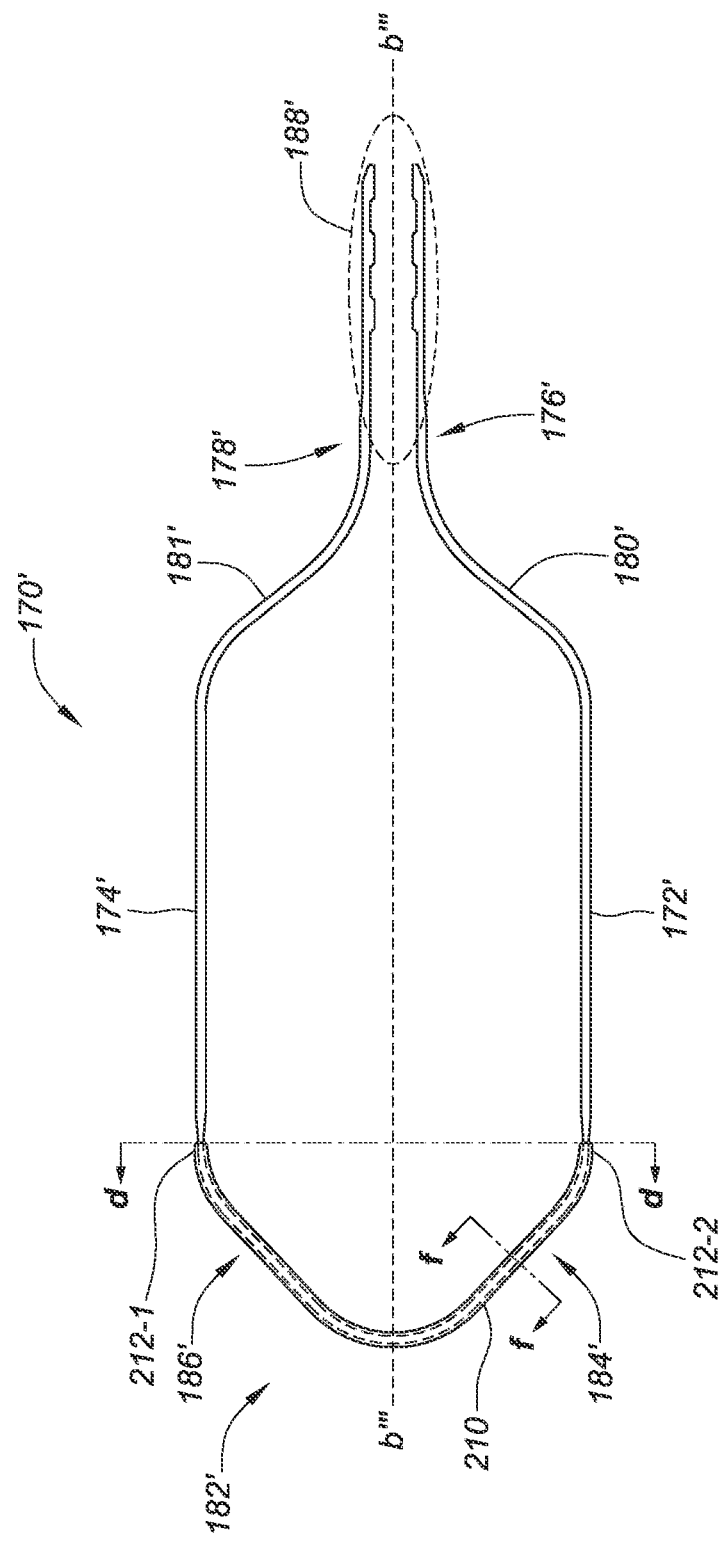
FIG. 5 is a top view of the outboard understructure depicted in FIG. 3 with an intermediate outboard covering, according to various embodiments of the present disclosure.

FIG. 5 is a top view of the outboard understructure depicted in FIG. 3 with an intermediate outboard covering, according to various embodiments of the present disclosure. As previously discussed, the outboard understructure 170' can include a first outboard arm understructure 172' and a second outboard arm understructure 174' and a first proximal outboard mounting arm 176' and a second proximal outboard mounting arm 178', which can be inserted into a distal end of a catheter to secure the inboard understructure to the catheter. The first outboard arm understructure 172' can be connected to the first proximal outboard mounting arm 176' via a first outboard transition understructure portion 180' and the second outboard arm understructure 174' can be connected to the second proximal outboard mounting arm 178' via a second outboard transition understructure portion 181'.

The outboard understructure 170 can include a head portion 182' that is connected to the distal ends of the first and second outboard arm understructures 172', 174'. The head portion 182' can include a first tapered element 184' and a second tapered element 186'. As previously discussed in relation to FIG. 3, as the tapered element 184' and the second tapered element 186' extend distally, the elements 184', 186' can each extend distally toward the tip longitudinal axis b'''b''' and converge at the longitudinal axis b'''b'''.

In some embodiments, an intermediate outboard covering 210 can be disposed about the continuous element that forms the outboard understructure 170'. As previously discussed, the continuous element that forms the outboard understructure 170' can be formed from a planar substrate. In some embodiments, the planar substrate can have a rectangular cross-section that includes defined edges. The intermediate outboard covering 210 can be disposed about the continuous element, thus covering defined edges of the inboard understructure, as previously discussed. In some embodiments, the intermediate outboard covering 210 can be disposed about a portion of the continuous element that forms the head portion 182'. The head portion 182' can be defined as the distal end of the outboard understructure 170', which begins to taper (e.g., converge) toward the tip longitudinal axis b'''b'''. For example, the head portion 182' is depicted in FIG. 5 as including the portion of the outboard understructure 170' that is located to the left of (with respect to the page) the line dd (e.g., distally of line dd).

In some embodiments, the intermediate outboard covering 210 can be disposed over an entirety of the continuous element that forms the outboard understructure 170' or can be partially disposed over a portion of the continuous element. In some embodiments, the intermediate outboard covering 210 can be disposed over the portion of the outboard understructure 170', which is not inserted in a distal end of a catheter. For example, the intermediate outboard covering 210 can be disposed over a portion of the outboard understructure 170' that is exposed and not located within the distal end of the catheter. In an example, the intermediate outboard covering can be disposed over the first proximal outboard mounting arm 176' and/or second proximal outboard mounting arm 178'. In some embodiments, the intermediate outboard covering can be disposed over the first proximal outboard mounting arm 176' and/or second proximal outboard mounting arm 178', as well as over portions of the outboard understructure 170' that are located distally to the first proximal outboard mounting arm 176' and/or second proximal outboard mounting arm 178'. In some embodiments, the intermediate outboard covering 210 can be disposed over the first outboard arm understructure 172' and second outboard arm understructure 174', as well as portions of the outboard understructure 170' that are distal to the first outboard arm understructure 172' and second outboard arm understructure 174'.

As further depicted with respect to FIG. 5, the intermediate outboard covering 210 can be disposed about the continuous element that forms the head portion 182'. In an example, the intermediate outboard covering 210 can be a tube that is slid over the head portion 182' or another portion of the outboard understructure 170'. For example, the tube can be slid over a proximal end of one of the first or second proximal outboard mounting arms 178', 176'. The tube can be cylindrical in shape, comprising a central lumen through which the continuous element that forms the outboard understructure 170' can pass. The tube can be slid along the continuous element that forms the outboard understructure 170' until the tube is disposed along the portion of the continuous element that forms the head portion 182' or other portion of the outboard understructure 170'. In some embodiments, the tube can be formed from a polymer (e.g., polytetrafluoroethylene (PTFE)). The tube can be a heat shrink tube, in some embodiments. For example, the tube can be positioned along the portion of the continuous element that forms the head portion 182' and heat can be applied to the tube to shrink the tubing, to form the intermediate outboard covering 210. In some embodiments, the intermediate outboard covering 210 can be a coating that is applied to the continuous element that forms the head portion 182'.

In some embodiments, the intermediate outboard covering 210 can have two proximal ends 212-1, 212-2. As depicted, the two proximal ends 212-1, 212-2 are depicted as being positioned at the interface between the head portion 182' and the first and second outboard understructures 172', 174'. For example, the two proximal ends 212-1, 212-2 can be positioned where the first tapered element 184' and the second tapered element 186' begin to taper toward the tip longitudinal axis b'''b'''. In some embodiments, and as depicted, the proximal ends 212-1, 212-2 are positioned at a same longitudinal position along the tip longitudinal axis b'''b'''.

The intermediate outboard covering 210 can serve the purpose of increasing a cross-sectional width of the continuous element and/or covering the defined edges of the planar substrate. For example, as further discussed herein, a defined edge that is covered by the intermediate outboard covering can become less defined, thus reducing an impact associated with the edge coming into contact with a tissue or other material.

Figure 6A:
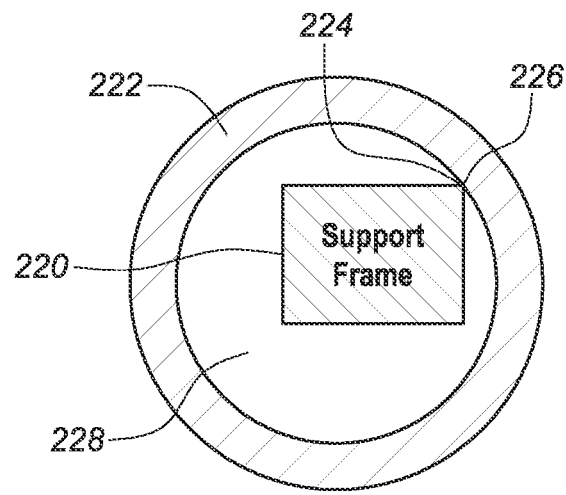
FIG. 6A is a cross-sectional view of an understructure and a covering disposed about a continuous element of the inboard understructure, according to various embodiments of the present disclosure.

FIG. 6A is a cross-sectional view of a covering disposed about a continuous element of an inboard understructure, according to various embodiments of the present disclosure. FIG. 6A depicts an inboard understructure 220, as previously discussed herein. As further depicted, and previously discussed, the inboard understructure 220 can have a rectangular cross-section, resulting in the inboard understructure 220 having defined edges (e.g., defined edge 224). In some embodiments, a covering 222 can be disposed about the inboard understructure 220. For example, the covering 222 can be disposed about a continuous element that forms the inboard understructure 220. The covering 222 can extend along a longitudinal axis and can define a covering lumen 228, in some embodiments, through which the continuous element that forms the inboard understructure 220 extends.

As previously discussed, the inboard understructure 220 can contact the covering 222, as a result of the inboard understructure 220 flexing from contact with tissue and/or deployment from a sheath, for example. The primary portion of the inboard understructure 220 that contacts the covering 220 can be the defined edges (e.g., defined edge 224). As a result of the contact between the inboard understructure 220 and particularly the defined edge 224 and the covering 222, holes can eventually be formed in the covering 222. In an example, contact between the inboard understructure 220 and the covering 222 can be concentrated in a contact area 226 where the defined edge 224 contacts the covering 222, causing a force exerted by the inboard understructure 220 to be concentrated on the covering 222 at the contact area 226. For ease of discussion, reference is made with regard to the inboard understructure 220, although embodiments discussed in relation to FIGS. 6A and 6B also apply to an outboard understructure.

Figure 6B:
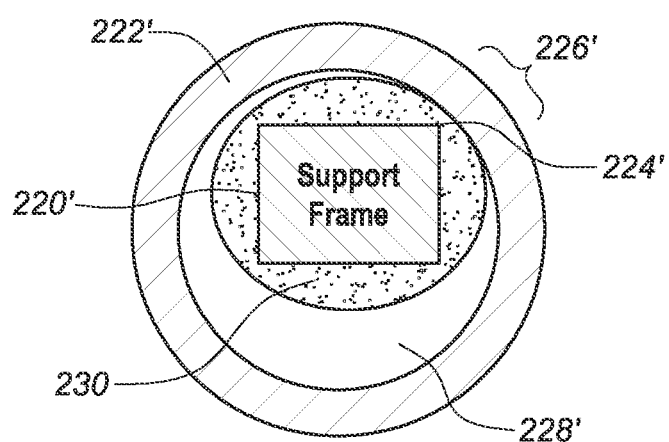
FIG. 6B is a cross-sectional view of an understructure and an intermediate inboard covering disposed about a first continuous element of the inboard understructure, along with a covering disposed about the understructure and the intermediate inboard covering, according to various embodiments of the present disclosure.

FIG. 6B is a cross-sectional view of an intermediate inboard covering 230 disposed about a first continuous element of the inboard understructure 220', along with a covering 222' disposed about the inboard understructure 220' and the intermediate inboard covering 230, according to various embodiments of the present disclosure. In some embodiments, as discussed herein, the intermediate inboard covering 230 can be disposed about the continuous element, thus covering defined edges of the inboard understructure 220', as previously discussed. Accordingly, contact between the inboard understructure 220' (e.g., defined edge 224') and the covering 222' can be concentrated in a contact area 226' where the portion of the intermediate inboard covering 230 that covers the defined edge 224' contacts the covering 222', causing a force exerted by the inboard understructure 220 to be concentrated on the covering 222 at the contact area 226'. In contrast to FIG. 6A, the contact area 226' has a greater surface area than the contact area 226 depicted in FIG. 6A. Accordingly, a force exerted by the inboard understructure 220' on the covering 222' can be reduced in relation to the force exerted by the inboard understructure 220, which does not include inboard covering 230, on the covering 222. Therefore, the amount of wear on the covering 222' caused by a defined edge 224' of the inboard understructure 220' can be reduced, as a result of the force exerted between the inboard understructure 220' and the inboard covering 222' being distributed across a greater surface area.

Figure 7A:
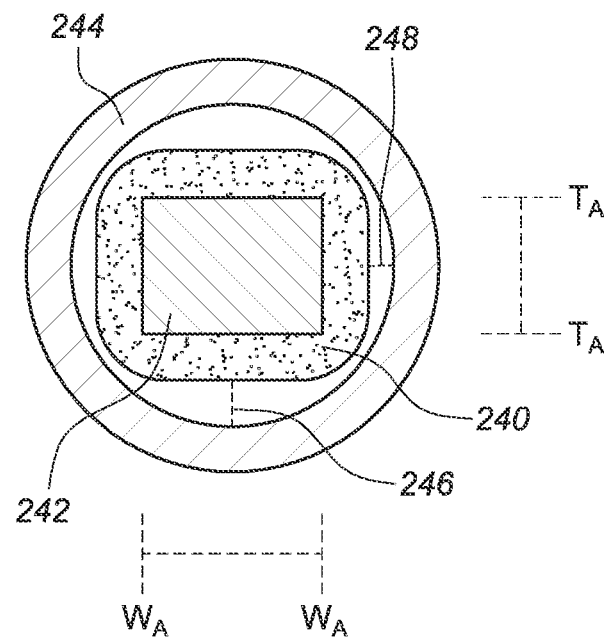
FIG. 7A is a cross-sectional view of an understructure and an intermediate covering of a first outer diameter disposed about a first continuous element of the understructure, along with a covering disposed about the understructure and the intermediate covering, according to various embodiments of the present disclosure.
Figure 7B:
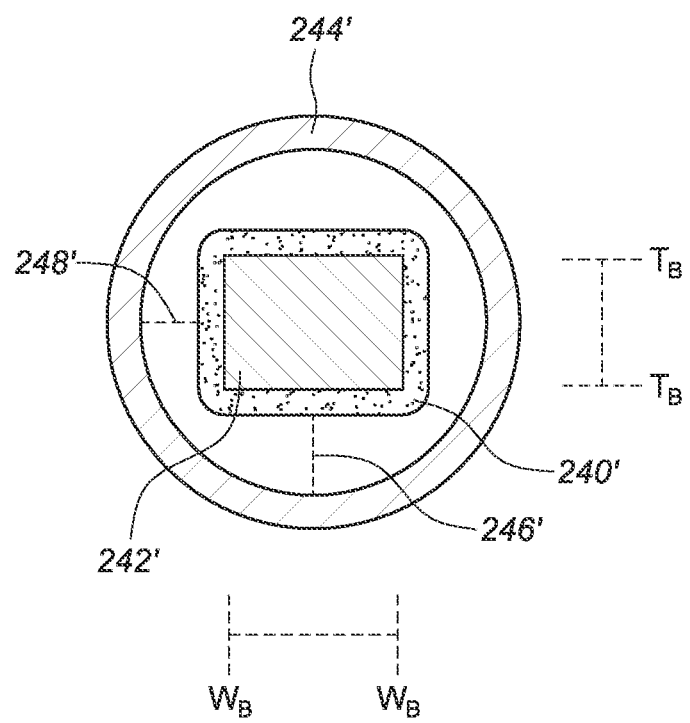
FIG. 7B is a cross-sectional view of an understructure and an intermediate covering of a second outer diameter disposed about a first continuous element of the understructure, along with a covering disposed about the understructure and the intermediate covering, according to various embodiments of the present disclosure.
Figure 7C:
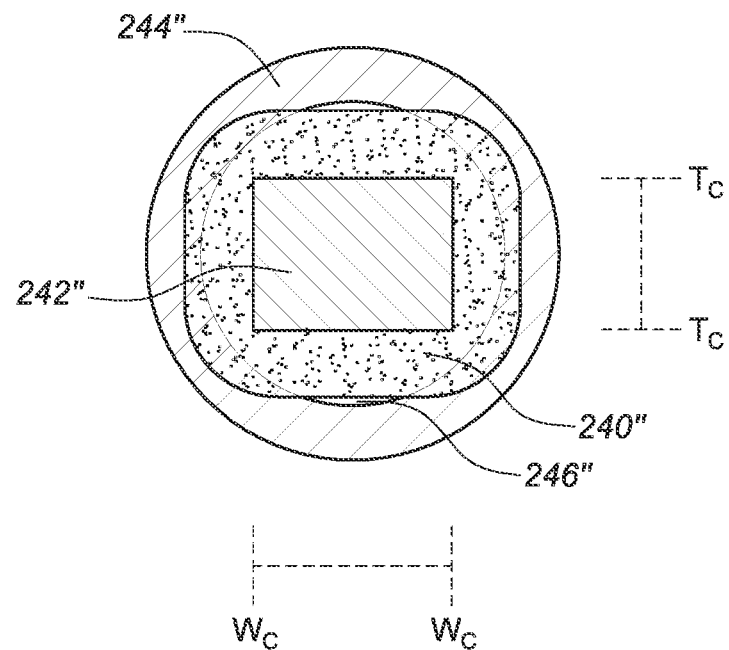
FIG. 7C is a cross-sectional view of an understructure and an intermediate covering of a third outer diameter disposed about a first continuous element of the understructure, along with a covering disposed about the understructure and the intermediate covering, according to various embodiments of the present disclosure.

FIG. 7A is a cross-sectional view of an intermediate covering 240 disposed about a first continuous element of an understructure 242, along with a covering 244 disposed about the understructure 242 and the intermediate inboard covering 240, according to various embodiments of the present disclosure. FIGS. 7A to 7C can depict a cross-sectional view of an understructure, such as those depicted in relation to FIGS. 4 and 5, along lines ee and ff. With further reference to FIG. 7A, the understructure 242 can be an inboard and/or outboard understructure, as discussed herein. In some embodiments, the intermediate covering 240 can be disposed around the understructure 242. For example, the intermediate covering 240 can be a heat shrink tube, in some embodiments, which is disposed around the intermediate covering 240. The understructure 242 can be slid through a lumen of the heat shrink tube until the heat shrink tube is properly positioned. In some embodiments, heat can be applied to the heat shrink tube to shrink the tube around the understructure 242. In some embodiments, the intermediate covering 240 can also be a coating applied to the understructure 242, as further discussed herein. In some embodiments, as depicted in FIG. 7A, the covering 244 can be disposed around the intermediate covering 240 and the understructure 242. In some embodiments, as depicted in FIGS. 7A to 7C, the covering 244 can have an inner diameter in a range from 0.013 inches to 0.015 inches, although the covering can have an inner diameter that can be less than or greater than the defined range. As depicted in FIG. 7A, the covering 244 can have an inner diameter of 0.014 inches. In some embodiments, as depicted in FIGS. 7A to 7C, the intermediate covering 240 can have a wall thickness in a range from 0.001 inches to 0.003 inches, although the wall thickness of the intermediate covering 240 can be less than or greater than the defined range. As depicted in FIG. 7A, the intermediate covering 240 can have a wall thickness of 0.002 inches. In some embodiments, as depicted in FIGS. 7A to 7C, the understructure 242 can have a width, defined by line WAWA, in a range from 0.0075 to 0.0085 inches, although the width of the understructure 242 can be less than or greater than the defined range. As depicted in FIG. 7A, the understructure 242 can have a width of 0.008 inches. In some embodiments, as depicted in FIGS. 7A to 7C, the understructure 242 can have a thickness, defined by line $T_A T_A$, in a range from 0.0055 to 0.0065 inches, although the thickness of the understructure 242 can be less than or greater than the defined range. As depicted in FIG. 7A, the understructure 242 can have a thickness of 0.006 inches.

FIGS. 7A to 7C depict varying sizes of gaps between an exterior surface of the intermediate covering 240 and an interior wall of the covering 244. With reference to FIG. 7A, in some embodiments, a bottom gap 246 between the exterior bottom/top surface of the intermediate covering 240 and the interior wall of the covering 244 can be in a range from 0 to 0.004 inches, although the gap can be of a smaller or larger size than the range provided. As depicted in FIG. 7A, the bottom gap 246 can be 0.003 inches. In some embodiments, a side gap 248 between the exterior surface of the intermediate covering 240 and the interior wall of the covering 244 can be in a range from 0 to 0.004 inches, although the gap can be of a smaller or larger size than the range provided. As depicted in FIG. 7A, the side gap 248 can be 0.002 inches. In some embodiments, an interference fit can exist between the exterior surface of the intermediate covering 240 and the interior surface of the covering 244, as further discussed in relation to FIG. 7C.

FIG. 7B is a cross-sectional view of an understructure 242' and an intermediate covering 240' disposed about a first continuous element of the understructure 242', along with a covering 244' disposed about the understructure 242' and the intermediate covering 240', according to various embodiments of the present disclosure. The understructure 242' can be an inboard and/or outboard understructure, as discussed herein. In some embodiments, the intermediate covering 240' can be disposed around the understructure 242'. In some embodiments, the intermediate covering 240' can also be a tube and/or coating applied to the understructure 242'. In some embodiments, as depicted in FIG. 7B, the covering 244' can be disposed around the intermediate covering 240' and the understructure 242'. As depicted in FIG. 7B, the covering 244' can have an inner diameter of 0.015 inches. As depicted in FIG. 7B, the intermediate covering 240' can have a wall thickness of 0.001 inches. As depicted in FIG. 7B, the understructure 242' can have a width, defined by line $W_B W_B$, of 0.0075 inches. As further depicted in FIG. 7C, the understructure 242" can have a thickness, defined by line $T_B T_B$, of 0.0055 inches. As depicted in FIG. 7B, a bottom gap 246' can be 0.004 inches. As depicted in FIG. 7B, the side gap 248' can be 0.003 inches.

FIG. 7C is a cross-sectional view of an understructure 242" and an intermediate covering 240" disposed about a first continuous element of the understructure 242", along with a covering 244" disposed about the understructure 242" and the intermediate covering 240", according to various embodiments of the present disclosure. The understructure 242" can be an inboard and/or outboard understructure, as discussed herein. In some embodiments, the intermediate covering 240" can be disposed around the understructure 242". In some embodiments, the intermediate covering 240" can also be a tube and/or coating applied to the understructure 242". In some embodiments, as depicted in FIG. 7C, the covering 244" can be disposed around the intermediate covering 240" and the understructure 242". As depicted in FIG. 7C, the covering 244" can have an inner diameter of 0.013 inches. As depicted in FIG. 7C, the intermediate covering 240" can have a wall thickness of 0.003 inches. As depicted in FIG. 7c, the understructure 242" can have a width, defined by line $W_C W_C$, of 0.0085 inches. As further depicted in FIG. 7C, the understructure 242" can have a thickness, defined by line $T_C T_C$, of 0.0065 inches.

As depicted in FIG. 7C, the bottom gap 246" can be 0 inches. In some embodiments, an interference fit can exist between the exterior surface of the intermediate covering 240" and the interior surface of the covering 244", as further discussed in relation to FIG. 7C. For example, as depicted, an interference fit can exist between a side of the exterior surface of the intermediate covering 240" and an interior side surface of the covering 244". For example, a width of the intermediate covering 240" can exceed a width of an inner diameter of the covering 244". Accordingly, the covering 244" can be stretched over the intermediate covering 240".

In some embodiments, as depicted in FIGS. 7A to 7C, the intermediate covering 240 can reduce a size of the gap between the understructure 242 and the inner wall of the covering 244. In some embodiments, the reduction in the size of the gap between the understructure 242 and the inner wall of the covering 244 can reduce the possible stretching/thinning of the covering 240. For example, as a high density mapping catheter that includes the understructure 242 is folded as the catheter is passed through a sheath, there can be friction between the sheath and the outer covering 244, which can pull against the outer covering. By introducing a smaller gap between the understructure 242 and the interior surface of the covering 244 via the intermediate covering 240, there can be a reduction in the amount of friction between the covering 244 and surfaces through which the catheter is being passed (e.g., surfaces of a sheath). Additionally, an amount by which the covering 244 is necked down (e.g., radially collapsed inward) is reduced. Thus, wear associated with the covering 244 can be reduced.

Figure 7D:
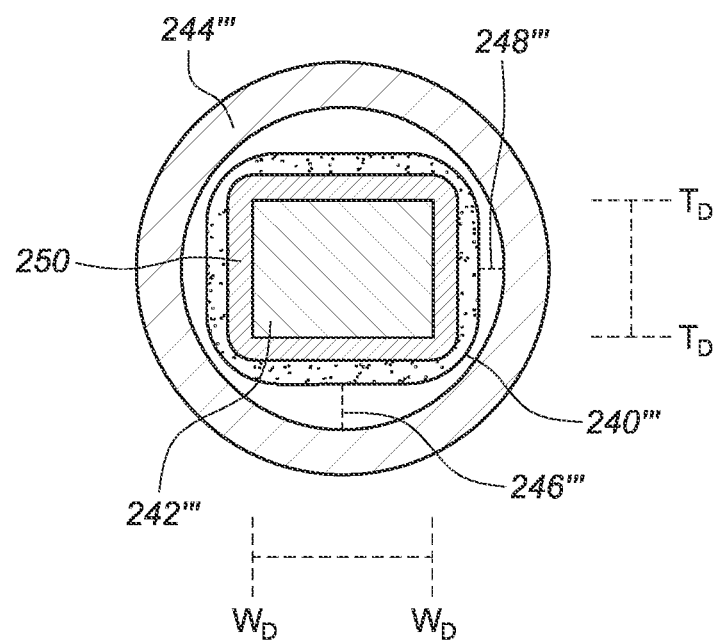
FIG. 7D is a cross-sectional view of an understructure and an inner first intermediate covering and outer second intermediate covering of the first outer diameter depicted in FIG. 7A, disposed about a first continuous element of the understructure, according to various embodiments of the present disclosure.

FIG. 7D is a cross-sectional view of an understructure 242''' and an inner first intermediate covering 250 and outer second intermediate covering 240''' of the first outer diameter depicted in FIG. 7A, disposed about a first continuous element of the understructure 242", according to various embodiments of the present disclosure. As depicted in FIG. 7D, an inner first intermediate covering 250 can be disposed about the understructure 242''' and an outer second intermediate covering 240''' can be disposed about the inner first intermediate covering 250 to create first and second layers of covering 250, 240''', as previously discussed herein. With reference to FIG. 7D, in some embodiments, a bottom gap 246''' between the exterior bottom/top surface of the outer second intermediate covering 240''' and the interior wall of the covering 244''' can be in a range from 0 to 0.004 inches, although the gap can be of a smaller or larger size than the range provided. As depicted in FIG. 7D, the bottom gap 246''' can be 0.003 inches, although the gap can be smaller or larger in size. For example, the gap can be in the range as that discussed in relation to FIGS. 7B and 7C. In some embodiments, a side gap 248''' between the exterior surface of the outer second intermediate covering 240''' and the interior wall of the covering 244''' can be in a range from 0 to 0.004 inches. As depicted in FIG. 7A, the side gap 248''' can be 0.002 inches, although the gap can be of smaller or larger size. For example, the gap can be in the range as that discussed in relation to FIGS. 7B and 7C.

In some embodiments, as previously discussed, an intermediate covering can consist of more than one layer of material that is disposed about the understructure 242'''. In an example, the inner first intermediate covering 250 of material can cover the understructure 242''' and an outer second intermediate covering 240''' can be disposed over the first layer of material. For instance, a first layer of heat shrink material can be disposed over a portion of the understructure 242''' and a second layer of heat shrink material can be disposed over the first layer of heat shrink material. In some embodiments, by including more than one layer of material that covers the portion of the understructure 242''', a greater diameter can be achieved, reducing an amount by which a covering 244''' is necked down.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it may be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It will be appreciated that the terms "proximal" and "distal" may be used throughout the specification with reference to a clinician manipulating one end of an instrument used to treat a patient. The term "proximal" refers to the portion of the instrument closest to the clinician and the term "distal" refers to the portion located furthest from the clinician. It will be further appreciated that for conciseness and clarity, spatial terms such as "vertical," "horizontal," "up," and "down" may be used herein with respect to the illustrated embodiments. However, surgical instruments may be used in many orientations and positions, and these terms are not intended to be limiting and absolute.

Although at least one embodiment for a layered high density electrode mapping catheter has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and may include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure may be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A flexible catheter tip, comprising:
    an inboard understructure that defines a tip longitudinal axis, wherein the inboard understructure is formed from a first continuous element comprising at least one tapered transition portion;
    an intermediate inboard covering disposed about an entirety of the first continuous element comprising the at least one tapered transition portion;
    an inboard covering disposed about the first continuous element and the intermediate inboard covering;
    an outboard understructure that extends along the tip longitudinal axis, wherein the outboard understructure is formed from a second continuous element;
    an intermediate outboard covering disposed about the second continuous element; and
    an outboard covering disposed about the first continuous element and the intermediate outboard covering,
    wherein each of the intermediate inboard covering, the intermediate outboard covering, the inboard covering, and the outboard covering extend about a respective circumference of a respective one of the inboard understructure and the outboard understructure,
    wherein a width of the intermediate inboard covering exceeds an inner diameter of the inboard covering or the outboard covering such that an interference fit exists at least one of between the intermediate inboard covering and the inboard covering or between the intermediate outboard covering and the outboard covering.

2. The flexible catheter tip of claim 1, wherein the intermediate inboard covering is disposed between the inboard understructure and the inboard covering.

3. The flexible catheter tip of claim 1, wherein the intermediate outboard covering is disposed between the outboard understructure and the outboard covering.

4. The flexible catheter tip of claim 1, wherein the intermediate inboard covering and the intermediate outboard covering are formed from a heat shrink material.

5. The flexible catheter tip of claim 1, wherein the inboard understructure includes:
    a first proximal inboard mounting arm and second proximal inboard mounting arm that extend along the tip longitudinal axis;
    a first inboard arm understructure that extends distally from the first proximal inboard mounting arm;
    a second inboard arm understructure that extends distally from the second proximal inboard mounting arm; and
    a flared head portion connected to distal ends of the first and second inboard arm understructures.

6. The flexible catheter tip of claim 1, wherein the intermediate inboard covering comprises an inner intermediate inboard covering disposed about the first continuous element and an outer intermediate inboard covering disposed about the inner intermediate inboard covering.

7. The flexible catheter tip of claim 6, wherein the inner intermediate inboard covering is disposed about an entirety of the first continuous element.

8. The flexible catheter tip of claim 6, wherein the outer intermediate inboard covering is disposed about an entirety of the first continuous element.

9. A flexible catheter tip, comprising:
an inboard understructure that defines a tip longitudinal axis,
wherein the inboard understructure is formed from a first continuous element,
wherein the first continuous element defines first and second inboard arm understructures and a flared head portion connected to a distal end of each of the first and second inboard arm understructures at corresponding tapered transition portions;
an intermediate inboard covering disposed about an entirety of the first continuous element including the flared head portion and the corresponding tapered portions, wherein the intermediate inboard covering comprises an inner intermediate inboard covering disposed about the first continuous element and an outer intermediate inboard covering disposed about the inner intermediate inboard covering;
an outboard understructure that extends along the tip longitudinal axis,
wherein the outboard understructure is formed from a second continuous element,
wherein the second continuous element defines first and second outboard arm understructures and a head portion connected to a distal end of each of the first and second outboard arm understructures;
an intermediate outboard covering disposed about the second continuous element including the head portion, wherein the intermediate outboard covering comprises an inner intermediate outboard covering disposed about the second continuous element and an outer intermediate outboard covering disposed about the inner intermediate outboard covering;
an inboard covering disposed about the intermediate inboard covering and the first continuous element including the flared head portion; and
an outboard covering disposed about the intermediate outboard covering and the second continuous element including the head portion,
wherein each of the inner intermediate inboard covering, the outer intermediate inboard covering, the inner intermediate outboard covering, the outer intermediate outboard covering, the inboard covering, and the outboard covering extend about a respective circumference and along an entire length along the tip longitudinal axis of a respective one of the inboard understructure and the outboard understructure.

10. The flexible catheter tip of claim 9, wherein the intermediate inboard covering is disposed between the inboard understructure and the inboard covering.

11. The flexible catheter tip of claim 9, wherein the intermediate outboard covering is disposed between the outboard understructure and the outboard covering.

12. The flexible catheter tip of claim 9, wherein:
the intermediate inboard covering includes a first proximal end and a second proximal end; and
wherein the first proximal end and the second proximal end are positioned at an interface between the flared head portion and the first and second inboard arm understructures.

13. The flexible catheter tip of claim 9, wherein the intermediate inboard covering is disposed about an entirety of the first continuous element.

14. The flexible catheter tip of claim 9, wherein the intermediate outboard covering is disposed about an entirety of the second continuous element.

15. A flexible catheter tip, comprising:
a flexible understructure that defines a tip longitudinal axis, wherein the flexible understructure is formed from a first continuous element that includes a first rectangular cross-section;
an intermediate covering disposed about the entirety of the first continuous element,
wherein the intermediate covering comprises an inner intermediate inboard covering disposed about the entirety of the first continuous element and an outer intermediate covering disposed about the entirety of the inner intermediate covering; and
a covering disposed about the entirety of the intermediate covering along the tip longitudinal axis, such that the intermediate covering is disposed between the covering and the flexible understructure.

16. The flexible catheter tip of claim 15, wherein an interference fit exists between the intermediate covering and the covering.

17. The flexible catheter tip of claim 16, further comprising a gap between the intermediate covering and the covering, wherein a size of the gap is in a range from 0 inches to 0.004 inches.

* * * * *